US008767765B2

(12) United States Patent
Jose et al.

(10) Patent No.: US 8,767,765 B2
(45) Date of Patent: Jul. 1, 2014

(54) METHODS AND APPARATUS FOR MEASURING INTERFERENCE AND COMMUNICATING INFORMATION

(75) Inventors: Jubin Jose, Bound Brook, NJ (US); Sundar Subramanian, Bridgewater, NJ (US); Xinzhou Wu, Hillsborough, NJ (US); Thomas Joseph Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 13/464,857

(22) Filed: May 4, 2012

(65) Prior Publication Data

US 2013/0294262 A1 Nov. 7, 2013

(51) Int. Cl.
*H04B 7/212* (2006.01)
*H04W 74/08* (2009.01)

(52) U.S. Cl.
CPC .................................... *H04W 74/08* (2013.01)
USPC .......................................... 370/442; 370/337

(58) Field of Classification Search
CPC .................................................... H04W 74/08
USPC ......... 370/204, 206, 225, 227, 228, 252, 278,
370/282, 294, 328, 329, 336, 337, 338, 343,
370/344, 345, 347, 348, 437, 442, 443, 447,
370/448, 458, 461, 498, 508, 432;
455/161.3, 226.1, 226.2, 226.3
See application file for complete search history.

(56) References Cited

U.S. PATENT DOCUMENTS

| | | | |
|---|---|---|---|
| 6,112,066 A * | 8/2000 | Hofmann et al. .......... 455/226.2 |
| 6,571,089 B1 * | 5/2003 | Richards et al. .............. 455/266 |
| 6,842,438 B1 * | 1/2005 | Benedict et al. ............... 370/328 |
| 7,369,549 B2 | 5/2008 | Wu et al. |
| 7,471,702 B2 | 12/2008 | Laroia et al. |
| 7,929,508 B1 | 4/2011 | Yucek et al. |
| 2001/0022782 A1 * | 9/2001 | Steudle .......................... 370/335 |
| 2002/0006119 A1 * | 1/2002 | Steudle .......................... 370/329 |
| 2002/0196845 A1 * | 12/2002 | Richards et al. .............. 375/239 |

(Continued)

FOREIGN PATENT DOCUMENTS

| | | |
|---|---|---|
| WO | 0124566 A1 | 4/2001 |
| WO | 2009038359 A2 | 3/2009 |

OTHER PUBLICATIONS

International Search Report and Written Opinion—PCT/US2013/039570—ISA/EPO—Aug. 5, 2013.

*Primary Examiner* — Paul H. Masur
*Assistant Examiner* — Michael Phillips
(74) *Attorney, Agent, or Firm* — Joseph B. Agusta

(57) ABSTRACT

A wireless communications device operates in a system where communications resources may be used by multiple devices concurrently. A device, with an acquired set of recurring time intervals, selects, e.g., pseudo-randomly, an interval or intervals to be used as a combined data transmission and channel measurement time interval. The other time intervals in its set are to be used as data transmission time intervals. The combined use type interval facilitates the measurement of interference on the device's channel while still allowing the device to transmit some data during the interval. A combined use interval includes a first portion for data transmission and a second portion for channel measurement. In some embodiments, the first portion is fixed size and the second portion occurs at the very end of the interval. In some embodiments, the duration of the first portion is varied over time such that the channel measurement start time varies.

20 Claims, 16 Drawing Sheets

(56) References Cited

U.S. PATENT DOCUMENTS

| | | |
|---|---|---|
| 2004/0160984 A1* | 8/2004 | Sidhushayana et al. ...... 370/474 |
| 2005/0083962 A1* | 4/2005 | Khun-Jush et al. ........... 370/445 |
| 2007/0217355 A1* | 9/2007 | de La Chapelle et al. .... 370/328 |
| 2008/0002792 A1* | 1/2008 | Shalev ........................ 375/345 |
| 2008/0146159 A1 | 6/2008 | Faltman et al. |
| 2009/0067448 A1* | 3/2009 | Stanwood et al. ........... 370/447 |
| 2010/0085973 A1 | 4/2010 | Li et al. |
| 2010/0144282 A1* | 6/2010 | Laroia et al. ................. 455/63.3 |
| 2010/0173586 A1 | 7/2010 | McHenry et al. |
| 2010/0178912 A1* | 7/2010 | Gunnarsson et al. ........ 455/423 |
| 2010/0197317 A1* | 8/2010 | Sadek et al. ................ 455/452.2 |
| 2010/0250170 A1* | 9/2010 | Kalinin et al. ................. 702/77 |
| 2010/0302962 A1* | 12/2010 | Oota ............................ 370/252 |
| 2011/0002379 A1 | 1/2011 | Raveendran |
| 2011/0159901 A1* | 6/2011 | Frenger et al. ................ 455/502 |
| 2012/0026908 A1* | 2/2012 | Tzannes et al. ............... 370/252 |
| 2012/0087292 A1 | 4/2012 | Grimm et al. |
| 2012/0106664 A1* | 5/2012 | Bonicatto et al. ............. 375/260 |
| 2012/0281569 A1* | 11/2012 | Yamamoto et al. ........... 370/252 |
| 2012/0294344 A1* | 11/2012 | Turtinen et al. ................ 375/224 |
| 2013/0130687 A1* | 5/2013 | Kumar Reddy et al. ...... 455/436 |
| 2013/0244719 A1* | 9/2013 | Nukala et al. ............... 455/550.1 |

\* cited by examiner

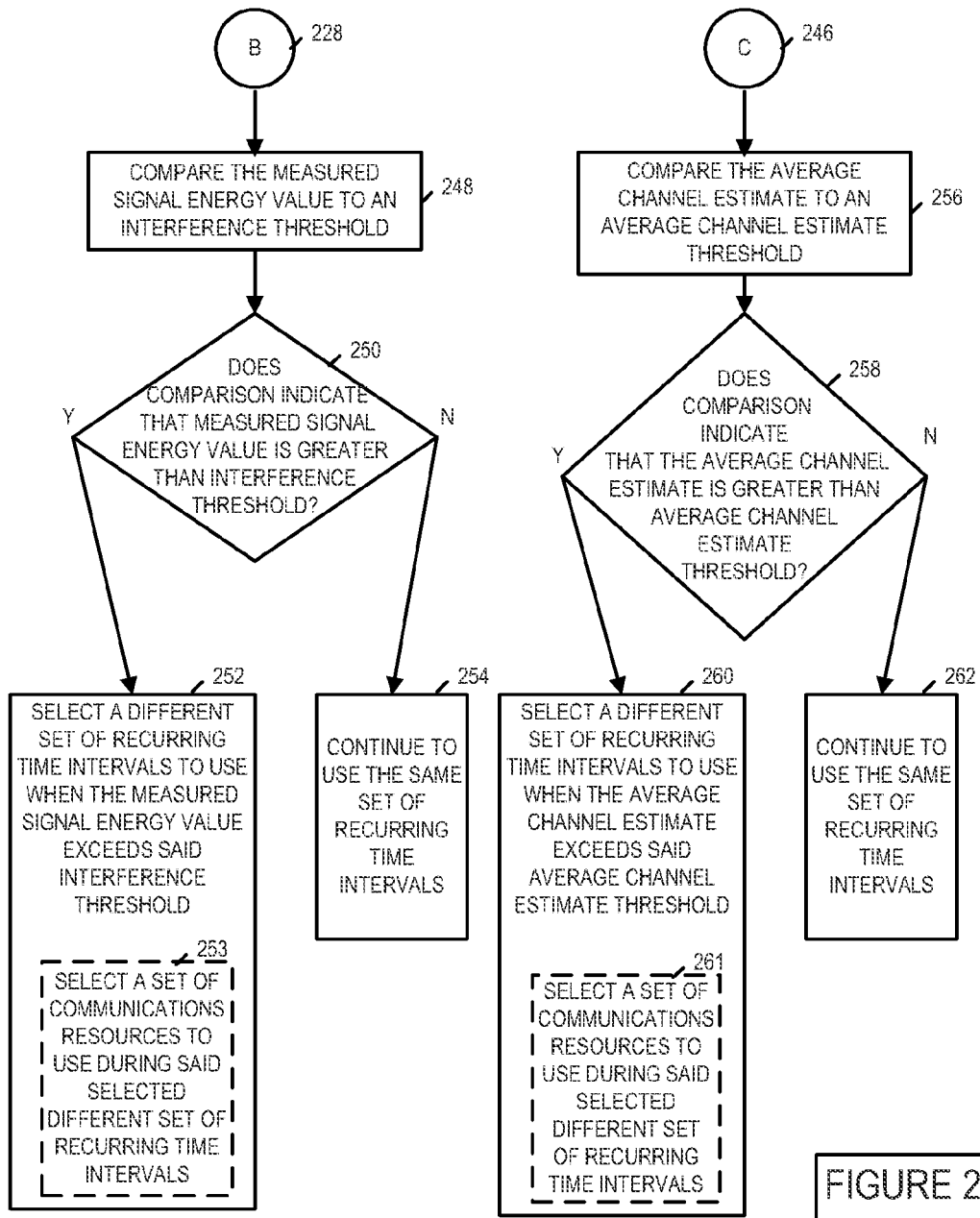

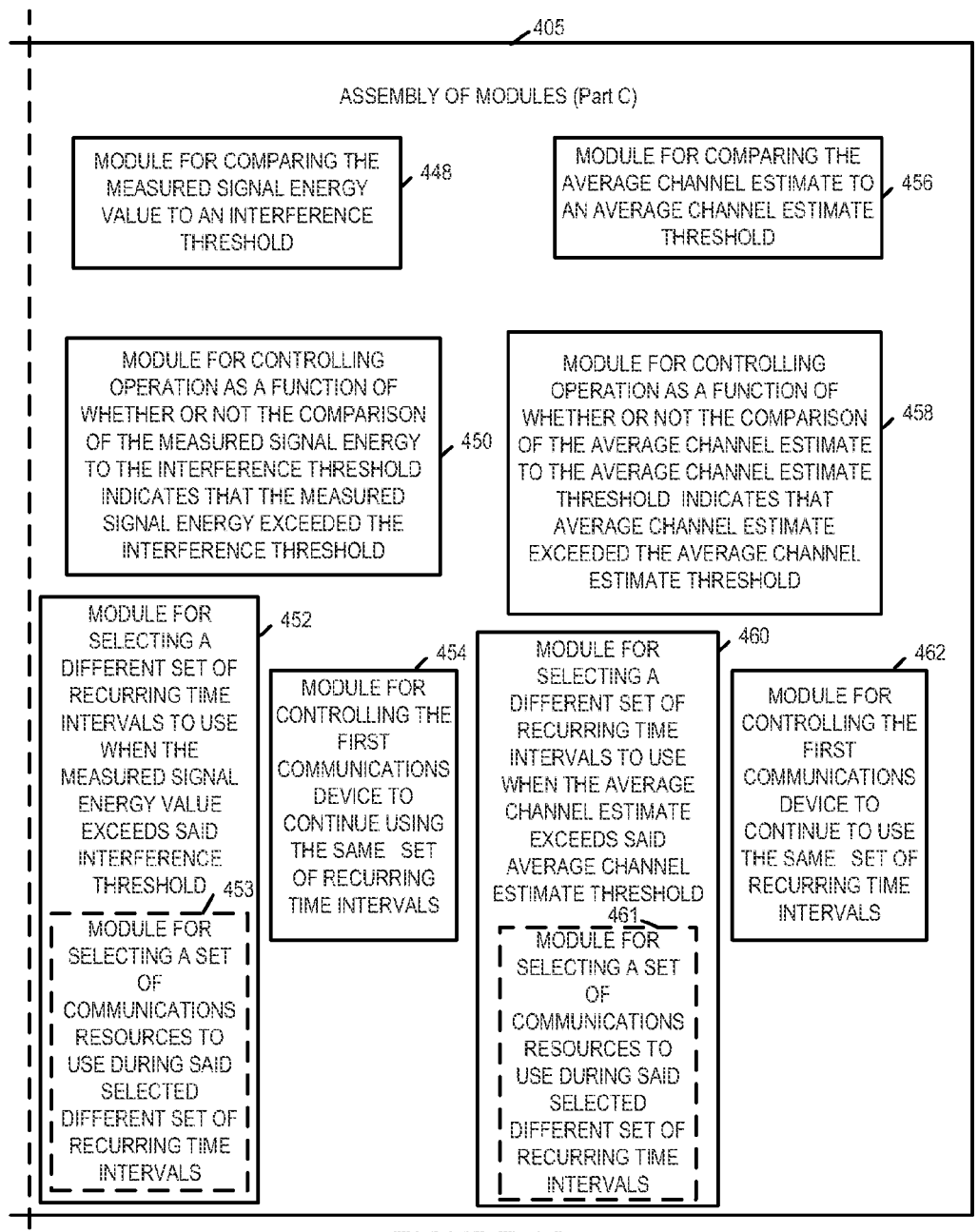

METHODS AND APPARATUS FOR MEASURING INTERFERENCE AND COMMUNICATING INFORMATION

FIELD

Various embodiments are directed to methods and apparatus for communicating information in a wireless communications system and, more specifically, to methods and apparatus for communicating information during time intervals, e.g., slots, and making interference measurements during at least some of the time intervals.

BACKGROUND

In traditional IEEE 802.11 based systems, when node density is high, concurrent broadcast transmissions tend to lack spatial separation. Synchronous systems overcome this drawback by using a hierarchical synchronous periodic channel structure. In such systems, nodes find a primary sub-resource (or slot) to transmit within each broadcast interval (K slots) in a distributed manner with the intervals recurring over time. Thus, the selected slot used by a device is a recurring communications resource.

For selecting and re-selecting the primary resource in a distributed manner, a node may sense the channel at different points in time, e.g., periodically. Since a node cannot sense while it is transmitting, to sense the primary resource, it typically remains silent or transmits in a secondary resource during these update intervals. However, both of these methods have drawbacks. If the node is silent during an entire interval, the overhead is significant, and more importantly, it may not be able to meet the requirement of transmitting in every broadcast interval imposed by systems such as safety broadcast in IEEE 802.11p. Instead, if the node transmits on a secondary resource during update intervals, the performance tends to degrade both in the primary and secondary resources due to the reduction in the number of effective sub-resources and/or poor spatial separation among transmitting nodes.

In view of the above discussion it should be appreciated that there is a need for improved methods and/or apparatus which allow a device to sense channel and/or other conditions without having to let an entire transmission interval go to waste and/or without requiring the use of a secondary alternative resource for transmission purposes while measurements are made in the primary resource, e.g., time slot. It would be desirable, from the perspective of accurately estimating channel conditions, if in it at least some, but not necessarily all time intervals, if the channel sensing was performed when it is likely that other devices, e.g., peer to peer devices using the same resource, were transmitting.

SUMMARY

Various embodiments are directed to methods and apparatus for communicating information using wireless signals during time intervals, e.g., slots, and making interference measurements during at least some of the time intervals. Various described methods and apparatus are well suited for use in synchronous peer to peer systems, e.g., for improving performance in broadcast channels.

A wireless communications device, which has acquired a set of recurring time intervals to be used by the wireless communications device, pseudo-randomly selects one or more of its time intervals to be used as a combined data transmission and channel measurement time intervals. In some but not necessarily all embodiments the selections of time intervals is made pseudo randomly and/or according to some other function intended to reduce and/or minimize the possibility that multiple devices, using the same time intervals for data communication, will select the same time intervals for channel measurement purposes. The other time intervals in its set of time intervals are to be used as data transmission time intervals. The combined data transmission and channel measurement time intervals facilitates the measurement of interference on the wireless communication device's channel while still allowing the wireless communications device to transmit some data during the time interval. In some embodiments, a wireless communications device treats its data transmission signaling differently during the two types of time intervals. For example, a device sometimes transmits a different amount of data, transmits using a different coding rate, transmits using a different level modulation constellation, and/or transmits at a different power level during a combined data transmission and channel measurement transmission interval than during a regular data transmission interval in which a channel measurement is not made by the device. In some embodiments, the same amount of information bits are communicated during the two types of intervals, e.g., with different levels of reliability.

It is likely that multiple wireless communications devices using the same channel will select different time intervals as being their combined data transmission and channel measurement time intervals. Thus one device's combined data transmission and channel measurement time interval may be another device's data transmission time interval.

In various embodiments, a combined data transmission and channel measurement time interval includes a first portion to be used for data transmission and a second portion to be used for channel measurement. In various embodiments, the first portion starts at the beginning of the time interval and is followed by the second portion. In some embodiments, the first portion is a fixed size and the second portion occurs at the very end of the interval. In some such embodiments, a wireless communications device, which is transmitting during at least one of its data transmission time intervals, transmits for the entire data transmission time interval to make it likely that its transmission will be measured by another device which considers the same interval to be a combined data transmission and channel measurement interval. In some such embodiments, zero padded data is included, as needed, in a data transmission time interval to be able to maintain the transmission for the duration of the interval. In such embodiments the zero padded data is communicated using at least some transmission power which can be measured.

In some embodiments, the duration of the data transmission in a data transmission time interval may, and sometime does vary. In some such embodiments, the duration of the first portion of a combined data transmission and channel measurement time interval is intentionally varied over time. Thus, in some embodiments, the channel measurement portion of the interval, which follows the transmission portion, starts at different points in time within the interval. This approach facilitates the detection of short length transmissions by other devices.

An exemplary method of operating a first communications device in a system where communications resources may be used by multiple devices at the same time, in accordance with some embodiments, comprises: transmitting data during a first time interval in a set of recurring time intervals corresponding to said first device; pseudo randomly selecting a second time interval in said set of recurring time intervals to be used as a combined data transmission and channel measurement time interval; transmitting data during a first portion of the second time interval; and performing a channel measurement during a second portion of the second time interval in said set of recurring time intervals, said second portion of the second time interval being a period of time in which said first communications device does not transmit. An exemplary first communications device, in accordance with some embodiments, comprises at least one processor configured to: transmit data during a first time interval in a set of recurring time intervals corresponding to said first device; pseudo randomly select a second time interval in said set of recurring time intervals to be used as a combined data transmission and channel measurement time interval; transmit data during a first portion of the second time interval; and perform a channel measurement during a second portion of the second time interval in said set of recurring time intervals, said second portion of the second time interval being a period of time in which said first communications device does not transmit. The exemplary first communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 2C is a first part of a flowchart of an exemplary method of operating a first communications device in accordance with various exemplary embodiments.

FIG. 4C is a third portion of an assembly of modules which can, and in some embodiments is, used in the exemplary first communications device illustrated in FIG. 3.

DETAILED DESCRIPTION

Figure 1:
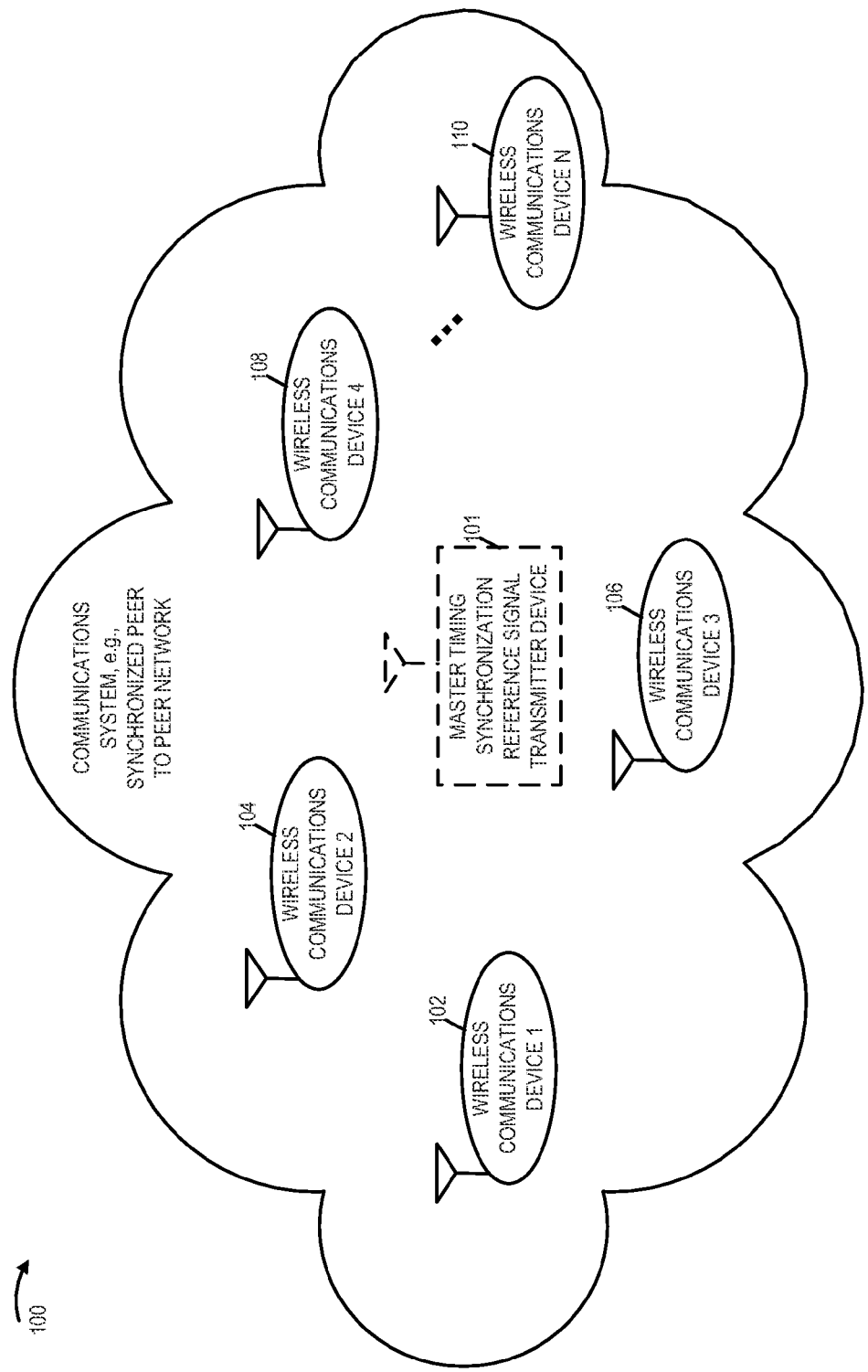
FIG. 1 is a drawing of an exemplary communications system in accordance with an exemplary embodiment.

FIG. 1 is a drawing of an exemplary communications system 100, e.g., a synchronized peer to peer network, in accordance with various exemplary embodiments. Exemplary system 100 includes a plurality of wireless communications devices (wireless communications device 1 102, wireless communications device 2 104, wireless communications device 3 106, wireless communications device 4 108, . . . , wireless communications device N 110). The wireless communications devices are, e.g., mobile devices supporting synchronized peer to peer communications. In some embodiments, network 100 includes a master timing synchronization reference signal transmitter device 101. In other embodiments, the master timing synchronization reference signal is transmitted by a device external to the system 100, e.g., a GPS satellite, a WAN base station, etc. In still other embodiments, the timing synchronization of system 100 is based on the timing of one of the wireless communications devices in the system 100.

In system 100 communications resources may be, and sometimes are, used by multiple devices at the same time. In some embodiments, a wireless communications device selects, e.g., self-reserves, a set of recurring time intervals from among a plurality of alternative sets of recurring time intervals to use to transmit data, e.g., to use to broadcast data such as peer discovery information. In one exemplary embodiment, the communications devices are located in vehicles and the broadcast peer discovery information includes one or more or all of: position information, velocity information, acceleration information, direction information, and time information.

In some embodiments, most of the time intervals in a selected set of recurring time intervals are used by the wireless communications device, which selected the set of recurring time intervals, to transmit information; while a few of the time intervals in the selected set of recurring time intervals are used by the wireless communications device, which selected the set of recurring time intervals, to transmit information and to monitor the channel, e.g., to estimate the level of interference from one or more other devices which may be using the same channel.

Different wireless communications devices in the system select different time intervals to use for transmission/monitoring. In some embodiments, the monitoring portion of an interval selected for transmission/monitoring occurs at the same position within the interval, e.g., at the end of the interval. In some other embodiments, the time position for monitoring within an interval selected for transmission/monitoring varies over time. In various embodiments, the monitoring portion follows the transmission portion for an interval selected to be used for transmission and monitoring. In some such embodiments, the length of the transmission portion varies as a function of the selected position within the interval for the monitoring to start.

In various embodiments, data transmission in a time interval selected to be used for both data transmission and channel monitoring is performed differently than is performed in a time interval selected to be used exclusively for data transmission. For example, the device may use a different data constraint, a different modulation scheme, a different modulation process for modulation level determination, a different modulation level, a different coding rate, a different code rate determination process, and/or a different power level with regard to its data transmissions during the two types of time intervals.

A wireless communications device which has selected one particular set of recurring time intervals may switch to an alternative set of recurring time intervals in response to a determination of a higher level of interference being detected during the channel monitoring. For example, two wireless communications devices which may be using the same set of recurring time intervals may have been originally far apart from one another causing insignificant interference to one another. Over time, the devices may have moved close to one another resulting in an unacceptable level of interference; therefore, one of the devices senses the high level of interference and switches to an alternative set of recurring time intervals.

Figure 2A:
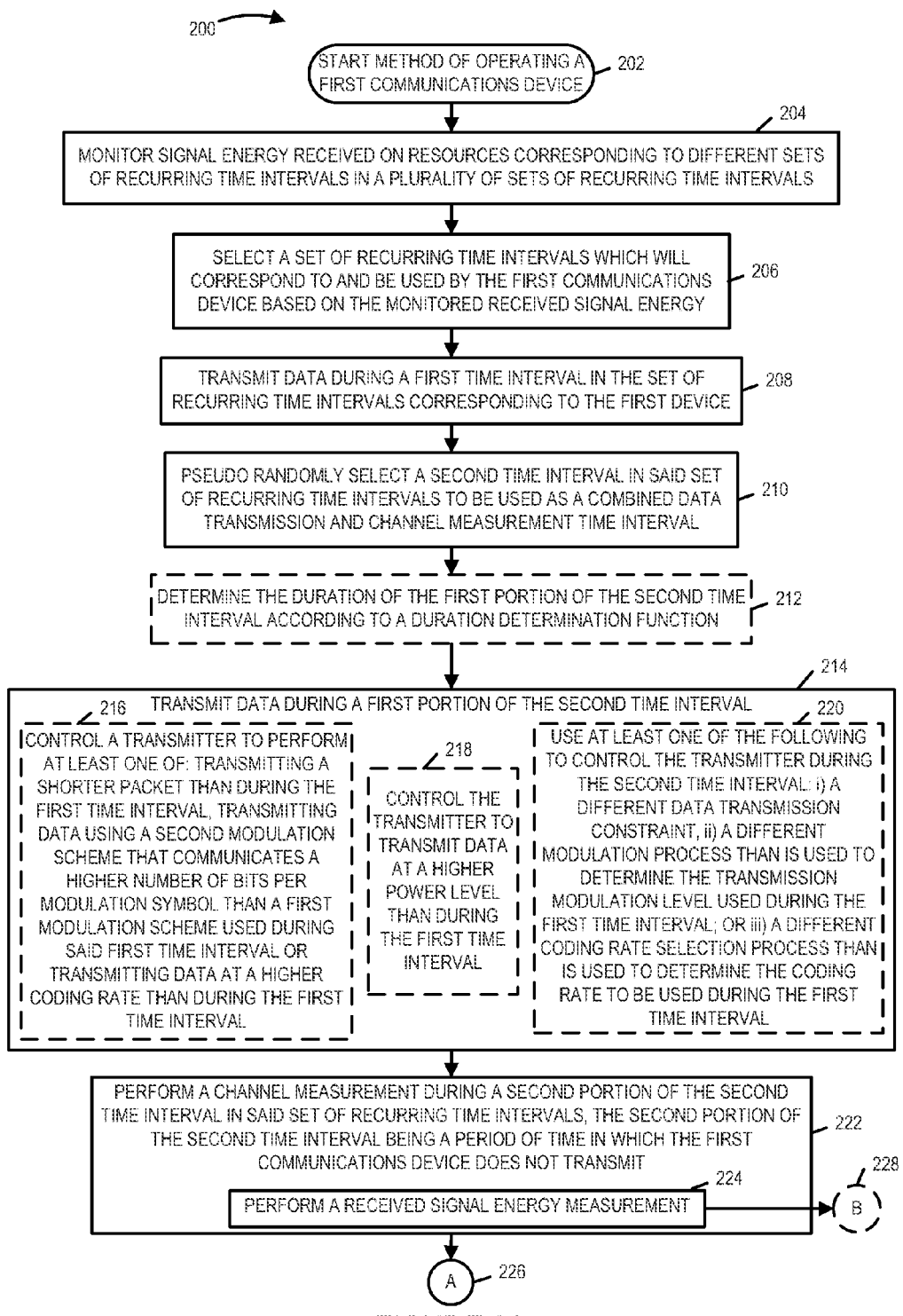
FIG. 2A is a first part of a flowchart of an exemplary method of operating a first communications device in accordance with various exemplary embodiments.
Figure 2B:
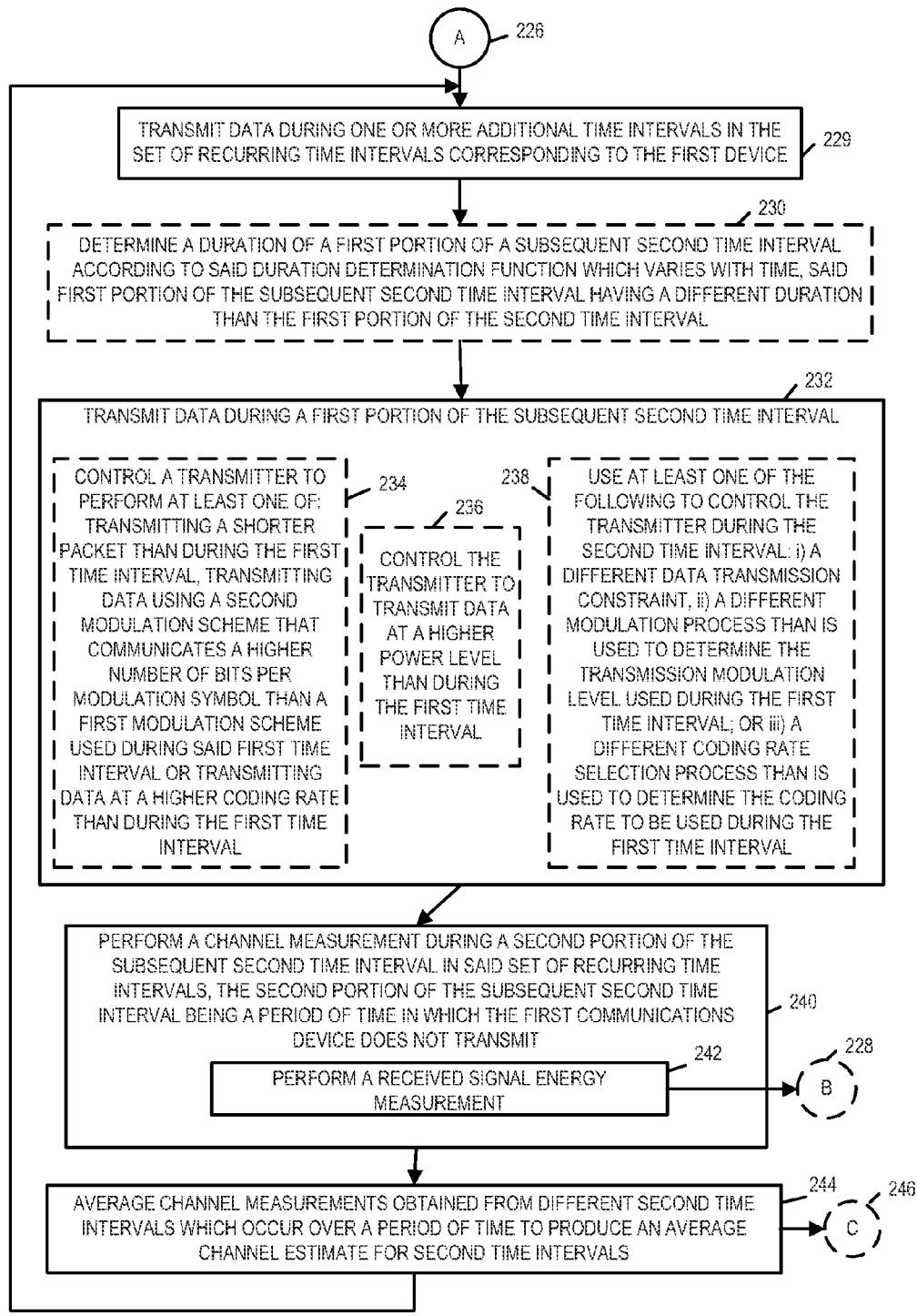
FIG. 2B is a second part of a flowchart of an exemplary method of operating a first communications device in accordance with various exemplary embodiments.

FIG. 2, comprising the combination of FIG. 2A, FIG. 2B and FIG. 2C, is a flowchart 200 of an exemplary method of operating a first communications device in a communications system where communications resources may be used by multiple devices at the same time, in accordance with various exemplary embodiments. The exemplary first communications device is, e.g., one of the wireless communications devices (102, 104, 106, 108, . . . , 110) of exemplary system 100 of FIG. 1. Operation of the exemplary method starts in step 202 where the first communications device is powered on and initialized. Operation proceeds from step 202 to step 204. In step 204 the first communications device monitors signal energy received on resources corresponding to different sets of recurring time intervals in a plurality of sets of recurring time intervals. Operation proceeds from step 204 to step 206, in which the first communications device selects a set of recurring time intervals which will correspond to and be used by the first communications device based on the monitored received signal energy. In some embodiments, the selected set of recurring time intervals is one of a plurality of sets of recurring time intervals which the first communications device may reserve. In some embodiments, the first communications device selects the set of recurring time intervals which corresponds to the minimum received signal energy from among the alternative possible sets of recurring time intervals which were monitored. In some other embodiments, the first communications device selects one of the sets of recurring time intervals which has a received signal energy level below a predetermined threshold. In some embodiments, time intervals in the set of recurring time intervals are of the same duration. Operation proceeds from step 206 to step 208.

In step 208, the first communications device transmits data during a first time interval in the set of recurring time intervals corresponding to the first device. In some embodiments, transmitting data during a first time interval includes transmitting data during the full first time interval. In some such embodiments, at least some of the transmitted data during the full first time interval is zero padded data. Operation proceeds from step 208 to step 210.

In step 210 the first communications device pseudo randomly selects a second time interval in said set of recurring time intervals to be used as a combined data transmission and channel measurement time interval. In some embodiments, the first communications device uses an interval selection to select the second time interval. In some such embodiments, different devices in the system in which the first communications device is located use a different interval selection function, said different interval selection function including at least one of: a different pseudo random function than is used by the first communications device or a different pseudo random number generator seed value.

In some embodiments, the first communications device uses a first set of communications resources, e.g., time/frequency resources, during said first and second time intervals. In some embodiments, other devices in the system may be and sometimes are, configured to transmit during the set of recurring time intervals in addition to the first device.

In some embodiments, e.g., an embodiment in which the duration of the first portion of a second time interval is fixed, operation proceeds from step 210 to step 214. In other embodiments, operation proceeds from step 210 to step 212.

In step 212 the first communications device determines the duration of the first portion of the second time interval according to a duration determination time function. Operation proceeds from step 212 to step 214

In step 214 the first communications device transmits data during a first portion of the second time interval. In some embodiments, step 214 includes one or more or all of steps 216, 218, and 220. In step 216, the first communications device controls a transmitter to perform at least one of: transmitting a shorter packet than during the first time interval, transmitting data using a second modulation scheme that communicates a higher number of bits per modulation symbol than a first modulation scheme used during said first time interval, or transmitting data at a higher coding rate than during the first time interval. In one example, the first modulation scheme is QAM 8 and the second modulation scheme is QAM 16. In another example, the first modulation scheme is BPSK and the second modulation scheme is QPSK. The higher coding rate gives more information bits for a given number of transmitted bits. In step 218, the first communications device controls the transmitter to transmit data at a higher power level than during the first time interval. In step 220, the first communications device uses at least one of the following to control the transmitter during the second time interval: i) a different data transmission constraint than is used to determine the amount of data transmitted during the first time interval, ii) a different modulation process than is used to determine the transmission modulation level used during the first time interval, or iii) a different coding rate selection process than is used to determine the coding rate to be used during the first time interval. In some embodiments, the different data transmission constraint is that less data is allowed to be transmitted during the second time interval than during the first time interval. Operation proceeds from step 214 to step 222.

In step 222 the first communications device performs a channel measurement during a second portion of the second time interval in said set of recurring time intervals, the second portion of the second time interval being a period of time in which the first communications device does not transmit. In various embodiments, the channel measurement is made on a set of resources used by the first communications device to transmit data during time intervals in said set of recurring time intervals. Thus the first communications device measures interference on the resource it uses to transmit data on a recurring basis.

In some embodiments, the first portion of time is located at the start of the second time interval and the second portion of time is located at the end of the second time interval. This approach is advantageous with IEEE 802.11 carrier sensing, i.e., the data transmission will be sensed by other devices so that they do not use the channel.

In various embodiments, the second portion of time is shorter than the first portion of time. In some such embodiments, the second portion of time is only long enough to measure the channel; therefore, the first communications device can use as much time as possible in the second time interval for its data transmission.

Step 222 includes step 224 in which the first communications device performs a received signal energy measurement. In some embodiments, operation proceeds from step 224 via connecting node B 228 to step 248.

Operation proceeds from step 222, via connecting node A 226 to step 229. In step 229 the first communications device transmits data during one or more additional time intervals in the set of recurring time intervals corresponding to the first device.

In some embodiments, operation proceeds from step 229 to step 232, while in other embodiments, operation proceeds from step 229 to step 230. In step 230, the first communications device determines a duration of a first portion of a subsequent second time interval according to said duration determination function which varies with time, said first portion of the subsequent second time interval having a different duration than the first portion of the second time interval. Operation proceeds from step 230 to step 232.

In step 232, the first communications device transmits data during a first portion of the subsequent second time interval. In various embodiments, step 232 includes one or more or all of: steps 234, 236 and 238. In step 234 the first communications device controls a transmitter to perform at least one of: transmitting a shorter packet than during the first time interval, transmitting data using a second modulation scheme that communicates a higher number of bits per modulation symbol than a first modulation scheme used during said first time interval, or transmitting data at a higher coding rate than during the first time interval. In step 236, the first communications device controls the transmitter to transmit data at a higher power level than during the first time interval. In step 238, the first communications device uses at least one of the following to control the transmitter during the second time interval: i) a different data transmission constraint, ii) a different modulation process than is used to determine the transmission modulation level used during the first time interval, or iii) a different coding rate selection process than is used to determine the coding rate to be used during the first time interval. Operation proceeds from step 232 to step 240.

In step 240, the first communications device performs a channel measurement during a second portion of the subsequent second time interval in said set of recurring time intervals, the second portion of the subsequent second time interval being a period of time in which the first communications device does not transmit. Step 240 includes step 242 in which the first communications device performs a received signal energy measurement. In some embodiments, operation proceeds from step 242 via connecting node B 228 to step 248.

Operation proceeds from step 240 to step 244. In step 244 the first communications device averages channel measurements obtained from different second time intervals which occur over a period of time to produce an average channel estimate for second time intervals. In some embodiments, the average is a weighted average with more recent measurement having more weight the earlier measurements. In some embodiments, operation proceeds from step 244 via connecting node C 246 to step 256.

Operation proceeds from step 244 to step 229 for additional transmissions during additional time intervals which are similar to the first time interval.

Returning to step 248, in step 248 the first communications device compares the measured signal energy value from step 224 or step 242 to an interference threshold. Operation proceeds from step 248 to step 250. In step 250, the first communications device determines if the comparison of step 248 indicates that the measured energy value is greater than the interference threshold. If the first communications device determines that the measured signal energy value is greater than the interference threshold, then operation proceeds to step 252; otherwise operation proceeds to step 254. In step 252 the first communications device selects a different set of recurring time intervals to use when the measured signal energy value exceeds said interference threshold. In some embodiments, step 252 includes step 253 in which the first communications device selects a set of communications resources to use during the selected different set of recurring time intervals. For example, the first communications device selects between a plurality of channels, e.g., tone sets to use during the selected set of time intervals. In step 254, the first communications device continues to use the same set of recurring time intervals.

Returning to step 256, in step 256 the first communications device compares the average channel estimate from step 244 to an average channel estimate threshold. In this example, a high value for the average channel estimate represents a large amount of interference from other devices using the same channel. Operation proceeds from step 256 to step 258, in which the first communications device determines if the comparison of step 256 indicates that the average channel estimate is greater than the average channel estimate threshold. If the first communications device determines that the average channel estimate is greater than the average channel estimate threshold, then operation proceeds to step 260; otherwise, operation proceeds to step 262. In step 260, the first communications device selects a different set of recurring time intervals to use when the average channel estimate exceeds the average channel estimate threshold. In some embodiments, step 260 includes step 261 in which the first communications device selects a set of communications resources to use during the selected different set of recurring time intervals. In step 262, the first communications continues to use the same set of recurring time intervals.

In some embodiments, the first communications device transmits data during each of the recurring time intervals in its set of recurring time intervals. For example, if the interval has been selected by the first communications device to be a combination data transmission and channel measurement interval, then the data transmission is performed in a similar manner to the data transmission during the second time interval; otherwise, the interval is a regular transmission interval and the data transmission is performed in a similar manner to the data transmission during the first time interval.

In various embodiments, the data transmissions are broadcast transmissions. In some embodiments, the broadcast transmissions include peer discovery data.

Figure 3:
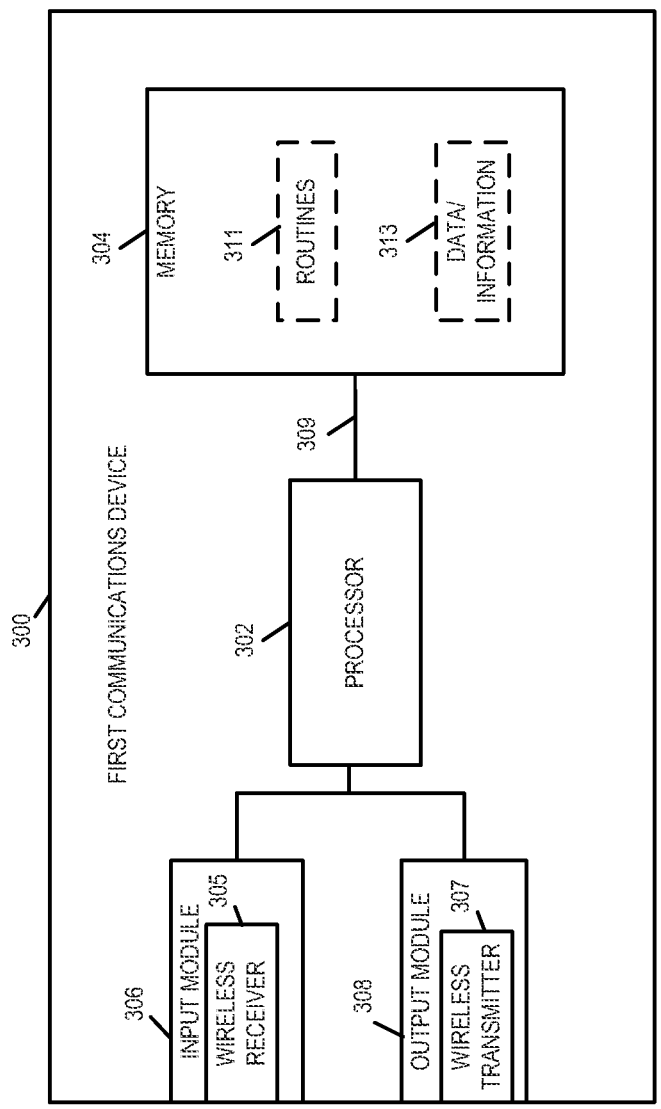
FIG. 3 is a drawing of an exemplary first communications device, e.g., a mobile node supporting peer to peer communications, in accordance with an exemplary embodiment.

FIG. 3 is a drawing of an exemplary first communication device 300, e.g., a mobile wireless terminal supporting peer to peer signaling, in accordance with an exemplary embodiment. Exemplary first communications device 300 is, e.g., one of the wireless communications devices of system 100 of FIG. 1. Exemplary first communications device 300 may, and sometimes does, implement a method in accordance with flowchart 200 of FIG. 2.

First communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 includes a wireless receiver 305 for receiving wireless signals. Input module 306 can, and in some embodiments does, also include a wired input interface and/or optical input interface for receiving input. Output module 308 includes a wireless transmitter 307 for transmitting wireless signals. Output module 308 can, and in some embodiments does, also include, a wired output interface and/or optical output interface for transmitting output. In some embodiments, memory 304 includes routines 311 and data/information 313.

In some embodiments, processor 302 is configured to: transmit data during a first time interval in a set of recurring time intervals corresponding to said first device; pseudo randomly select a second time interval in said set of recurring time intervals to be used as a combined data transmission and channel measurement time interval; transmit data during a first portion of the second time interval; and perform a channel measurement during a second portion of the second time interval in said set of recurring time intervals, said second portion of the second time interval being a period of time in which said first communications device does not transmit. In some embodiments, the channel measurement is made on a set of resources used by said first communications device to transmit data during time intervals in said set of recurring time intervals to transmit data. For example, processor 302 of the first communications device is configured to measure interference on the resource it uses to transmit data on a recurring basis.

In some embodiments, processor 302 is configured to transmit data during the full first time interval, as part of being configured to transmit data during the first time interval. In some such embodiments, at least some of the transmitted data during the full first time interval is zero padding data.

In some embodiments, processor 302 is configured to use a first set of communications resources, e.g., a first set of time/frequency resources, during said first and second time intervals. In some embodiments, the sets of time/frequency resources are sets of OFDM tone-symbols.

In some embodiments, processor 302 is configured to control a transmitter, e.g., transmitter 307 in device 300, to perform at least one of: transmitting a shorter packet than during the first time interval, transmitting data using a second modulation scheme that communicates a higher number of bits per modulation symbol than a first modulation scheme used during said first time interval, or transmitting data at a higher coding rate, e.g., more information bits for a given number of transmitted bits, than during said first time interval, as part of being configured to transmit during a first portion of the second time interval. In some embodiments, processor 302 is configured to control the transmitter to transmit data at a higher power level than during the first time interval, as part of being configured to transmit during a first portion of the second time interval.

In various embodiments, processor 302 is further configured to determine the duration of the first portion of the second time interval according to a duration determination function. In some such embodiments, processor 302 is further configured to: determine a duration of a first portion of a subsequent second time interval according to said function which varies with time, said first portion of the subsequent second time interval having a different duration than the first portion of said second time interval; and perform a channel measurement during a second portion of the subsequent second time interval in said set of recurring time intervals, said second portion of the subsequent second time interval being a period of time in which said first communications device does not transmit.

In some embodiments, processor 302 is configured to: average channel measurements obtained from different second time intervals which occur over a period of time to produce an average channel estimate for second time intervals.

In various embodiments, different devices, e.g., different wireless communications devices, in a system in which said first communications device is located use a different interval selection function, said different interval selection function including at least one of: a different pseudo random function than is used by the first communications device or a different pseudo random number generator seed value. In some such embodiments, processor 302 is configured to determine second time intervals using an interval selection function. In some such embodiments, processor 302 is configured to include at least one of a pseudo random number generator function or a pseudo random number generator seed value.

In some embodiments, time intervals in said set of recurring time intervals are of the same duration, and processor 302 is further configured to use at least one of the following to control said transmitter during said second time interval: i) a different data transmission constraint than is used to determine the amount of data transmitted during the first time interval, ii) a different modulation process than is used to determine the transmission modulation level used during the first time interval; or iii) a different coding rate selection process than is used to determine the coding rate to be used during the first time interval. In some such embodiments, the different data transmission constraint allows less data to be transmitted during a second time interval than during a first time interval.

In some embodiments, the first portion of time is located at the start of the second time interval and the second portion of time is located at the end of the second time interval. This approach of transmitting data and then monitoring is advantageous with IEEE 802.11 carrier sensing—i.e., the data transmission in the first portion of the second interval by the first communications device, which has reserved the resource, will be sensed by other devices so they don't use the channel.

In some embodiments, the second portion of time is shorter than said first portion of time. For example, in some embodiments, the second portion is only long enough to measure the channel. In some embodiments, the first communications device uses as much time as possible for data transmission within the second time interval.

In some embodiments, the channel measurement is a received signal energy measurement, and processor 302 is configured to perform a received signal energy measurement. In some embodiments, said first set of recurring time intervals is one of a plurality of sets of recurring time intervals which the first communications device may reserve, and processor 302 is further configured to: compare a measured signal energy value to an interference threshold; and select a different set of recurring time intervals to use when said measured signal energy exceeds said interference threshold.

In some embodiments, processor 302 is configured to select a set of communications resources to use during said selected different set of recurring time intervals, as part of being configured to select a different set of recurring time intervals. For example, processor 302 is configured to select between a plurality of channels, e.g., tone sets, to use during the selected set of time intervals.

Figure 4A:
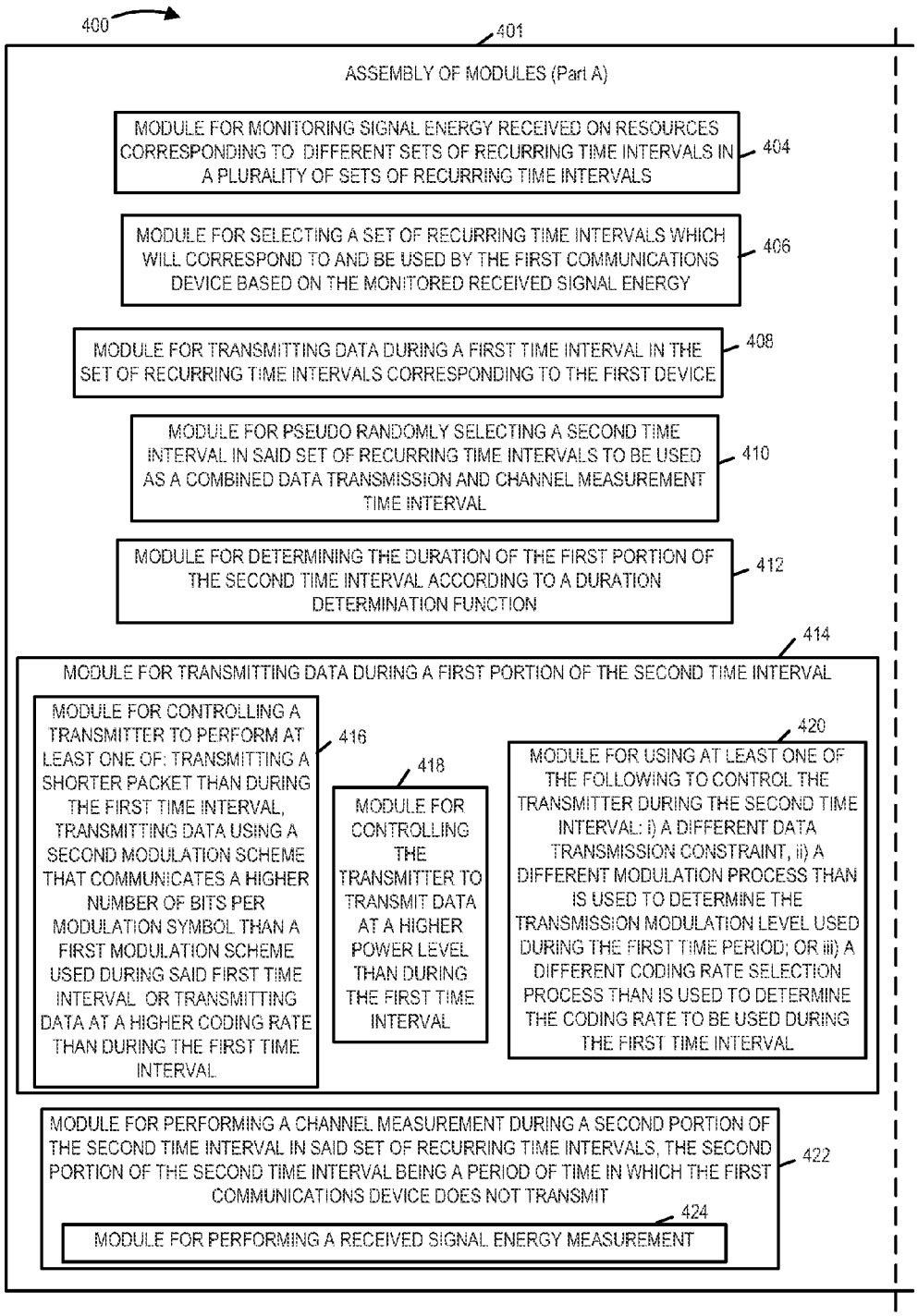
FIG. 4A is a first portion of an assembly of modules which can, and in some embodiments is, used in the exemplary first communications device illustrated in FIG. 3.
Figure 4B:
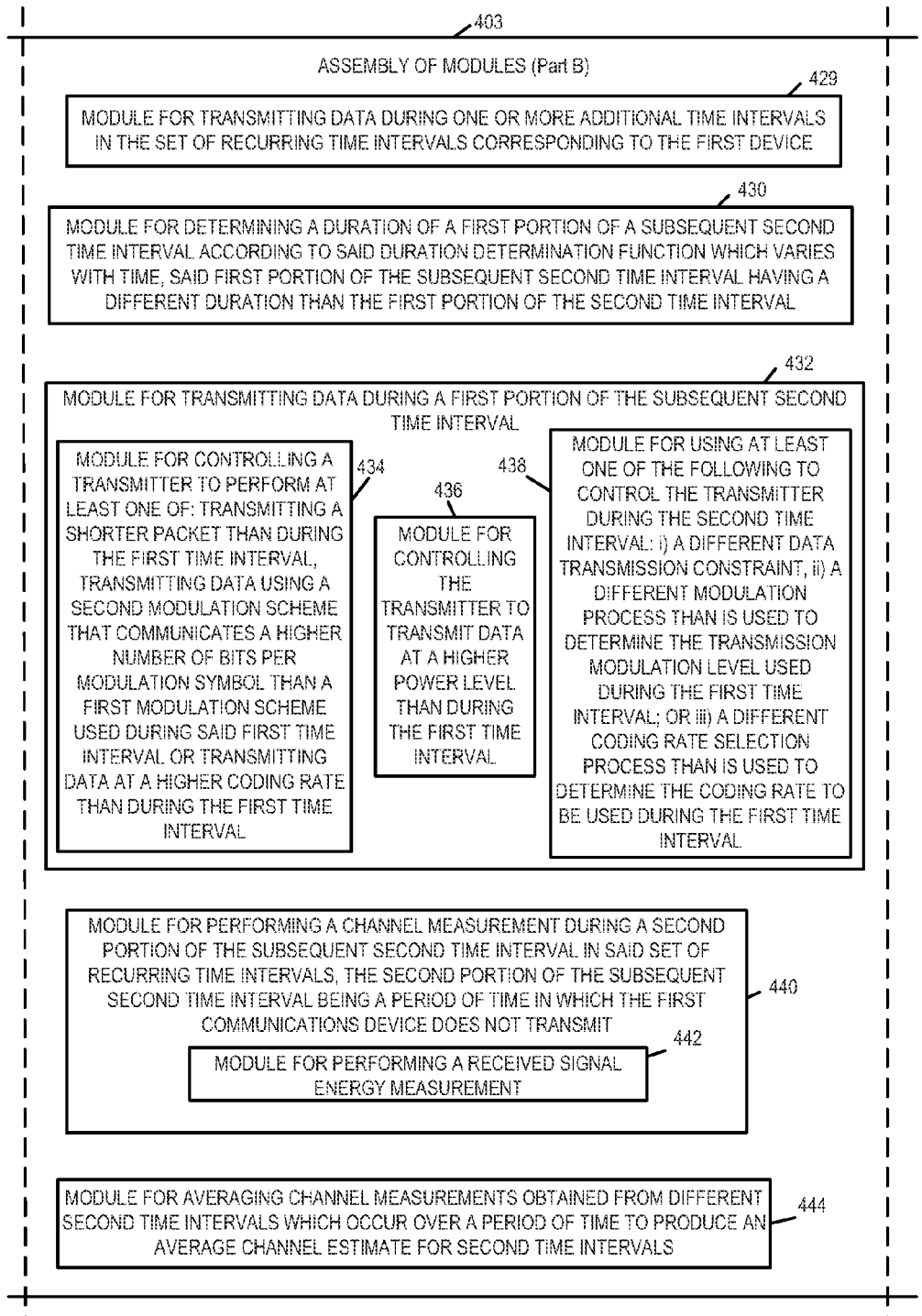
FIG. 4B is a second portion of an assembly of modules which can, and in some embodiments is, used in the exemplary first communications device illustrated in FIG. 3.

FIG. 4 is an assembly of modules 400 which can, and in some embodiments is, used in the exemplary first communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of wireless communications device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless communications device 300 or elements therein such as the processor 302, to perform the functions of the corresponding steps illustrated and/or described in the method of flowchart 200 of FIG. 2.

Assembly of modules 400, comprising the combination of Part A 401, Part B 403, and Part C 405, includes a module for monitoring signal energy received on resources corresponding to different sets of recurring time intervals in a plurality of sets of recurring time intervals 404, and a module for selecting a set of recurring time intervals which will correspond to and be used by the first communications device based on the monitored received signal energy 406. In various embodiments, module 406 selects one of a plurality of sets of recurring time intervals which the first communications device may reserve. Assembly of modules 400 further includes a module for transmitting data during a first time interval in the set of recurring time intervals corresponding to the first device 408, a module for pseudo randomly selecting a second time interval in said set of recurring time intervals to be used as a combined data transmission and channel measurement time interval 410, a module for determining the duration of the first portion of the second time interval according to a duration determination function 412, a module for transmitting data during a first portion of the second time interval 414 and a module for performing a channel measurement during a second portion of the second time interval in said set of recurring time intervals, the second portion of the second time interval being a period of time in which the first communications device does not transmit 422.

In some embodiments, module 408 transmits data during the full first time interval. In some such embodiments, at least some of the transmitted data during the full first time interval is zero padding data. In some embodiments, the channel measurement made by module 422 is made on a set of resources used by the first communications device to transmit data during time intervals in said set of recurring time intervals. Thus, the first communications device measures interference on the resource it uses to transmit data on a recurring basis. In some embodiments, the first communications device uses a first set of communications resources, e.g., time/frequency resources, during the first and second time intervals.

In various embodiments, module 410 selects an interval using an interval selection function. In some embodiments, different devices in a system in which the first device is located use a different interval selection function for selecting a second time interval, said different interval selection function including at least one of: a different pseudo random function than is used by the first communications device or a different pseudo random number generator seed value.

Module 414 includes a module for controlling a transmitter to perform at least one of: transmitting a shorter packet than during the first time interval, transmitting data using a second modulation scheme that communicates a higher number of bits per modulation symbol than a first modulation scheme used during said first time interval, or transmitting data at a higher coding rate than during the first time interval 416, a module for controlling the transmitter to transmit data at a higher power level than during the first time interval 418, and a module for using at least one of the following to control the transmitter during the second time interval: i) a different data transmission constraint than is used to determine the amount of data transmitted during the first time interval, ii) a different modulation process than is used to determine the transmission modulation level used during the first time interval, or iii) a different coding rate selection process than is used to determine the coding rate to be used during the first time interval 420. In some embodiments, time intervals in said set of recurring time intervals are of the same duration. Module 422 includes a module for performing a received signal energy measurement 424.

Assembly of modules 400 further includes a module for transmitting data during one or more additional time intervals in the set of recurring time intervals corresponding to the first device 429, a module for determining a duration of a first portion of a subsequent second time interval according to said duration determination function which varies with time, said first portion of the subsequent second time interval having a different duration than the first portion of the second time interval 430, a module for transmitting data during a first portion of the subsequent second time interval 432, a module for performing a channel measurement during a second portion of the subsequent second time interval in said set of recurring time intervals, the second portion of the subsequent second time interval being a period of time in which the first communications device does not transmit 440, and a module for averaging channel measurements obtained from different second time intervals which occur over a period of time to produce an average channel estimate for second time intervals 444. Module 432 includes a module for controlling a transmitter to perform at least one of: transmitting a shorter packet than during the first time interval, transmitting data using a second modulation scheme that communicates a higher number of bits per modulation symbol than a first modulation scheme used during said first time interval, or transmitting data at a higher coding rate than during the first time interval 434, a module for controlling the transmitter to transmit data at a higher power level than during the first time interval 436, and a module for using at least one of the following to control the transmitter during the second time interval: i) a different data transmission constraint, ii) a different modulation process than is used to determine the transmission modulation level used during the first time interval, or iii) a different coding rate selection process than is used to determine the coding rate to be used during the first time interval 438. Module 440 includes a module for performing a received signal energy measurement 442.

Assembly of modules 400 further includes a module for comparing the measured signal energy to an interference threshold 448, a module for controlling operation as a function of whether or not the comparison of the measured signal energy to the interference threshold indicates that the measured signal energy exceeded the interference threshold 450, a module for selecting a different set of recurring time intervals to use when the measured signal energy exceeds the interference threshold 452, and a module for controlling the first communications device to continue using the same set of recurring time intervals when the comparison indicates that the received signal energy does not exceed the interference threshold 454. Assembly of modules 400 further includes a module for comparing the average channel estimate to an average channel estimate threshold 456, a module for controlling operation as a function of whether or not the comparison of the average channel estimate to the average channel estimate threshold indicates that the average channel estimate exceeded the average channel estimate threshold 458, a module for selecting a different set of recurring time intervals to use when the average channel estimate exceeds said average channel estimate threshold 460 and a module for controlling the first communications device to continue to use the same set of recurring time intervals when the comparison indicates that the average channel estimate does not exceed the average channel estimate threshold 462.

In some embodiments, module 452 includes a module for selecting a set of communications resources to use during the selected different set of recurring time intervals 453. In some embodiments, module 460 includes a module for selecting a set of communications resources to use during the selected different set of recurring time intervals 461.

In some embodiments, the first portion of time is located at the start of the second time interval and the second portion of time is located at the end of the second time interval. This approach is advantageous with IEEE 802.11 carrier sensing—i.e., the data transmission will be sensed by other devices so they do not use the channel.

In various embodiments, the second portion of time is shorter than the first portion of time. In some such embodiments, the second portion is only long enough to measure the channel. In some embodiments, this allows for as much time as possible to be allocated to the first portion for data transmission.

Figure 5:
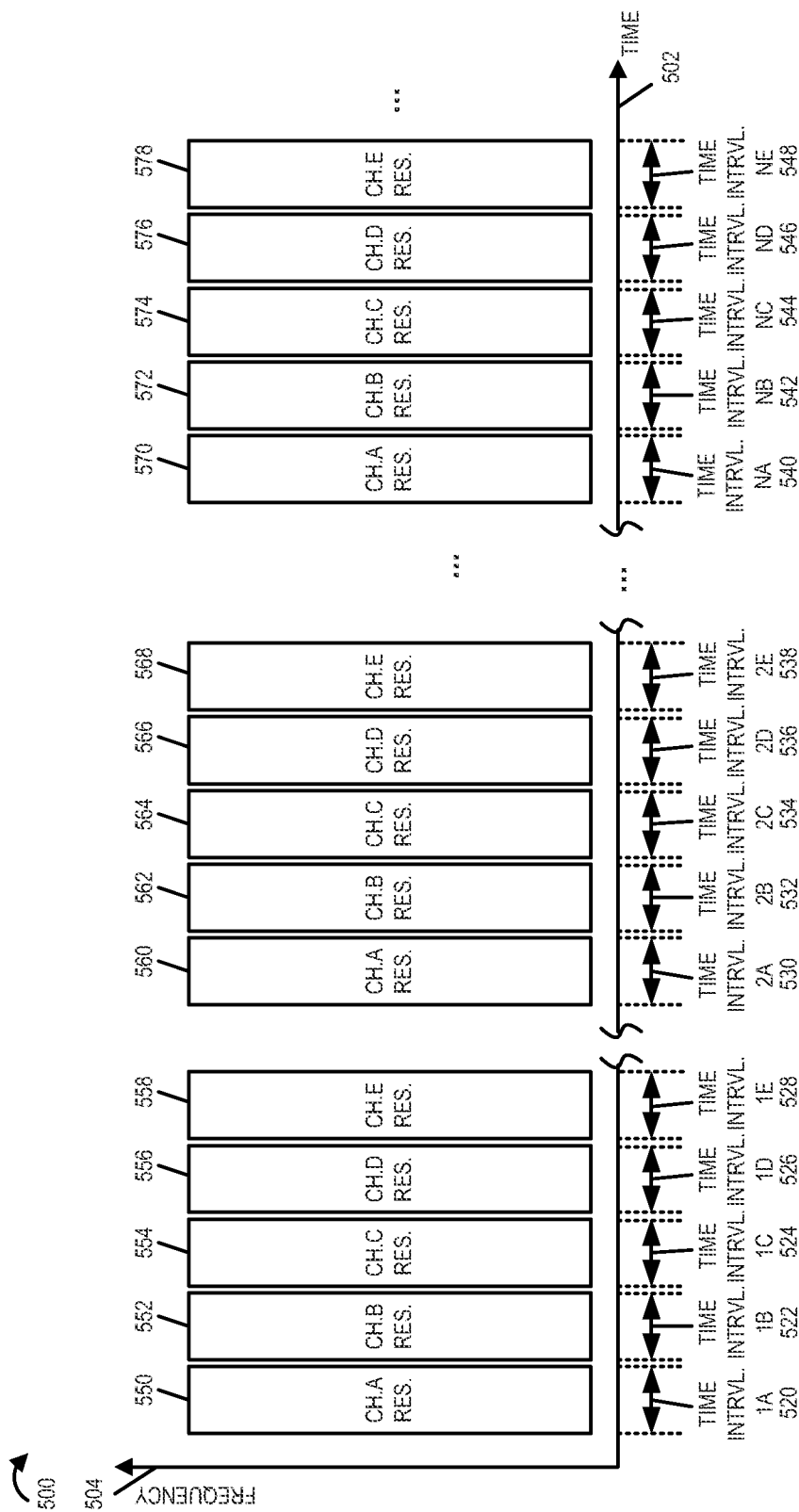
FIG. 5 is a drawing illustrating exemplary sets of recurring time intervals and exemplary air link resources in an exemplary recurring timing frequency structure.

FIG. 5 is a drawing 500 illustrating exemplary sets of recurring time intervals and exemplary air link resources in an exemplary recurring timing frequency structure. Horizontal axis 502 represents time, e.g., OFDM symbol transmission time intervals, and vertical axis 504 represents frequency, e.g., OFDM tones. In some embodiments, the exemplary recurring timing frequency structure of FIG. 5 is used by wireless communications devices in system 100 of FIG. 1, and/or by a wireless communications device 300 of FIG. 3 and/or by a wireless communications device implementing a method in accordance with flowchart 200 of FIG. 2.

In this example, there are five different sets of recurring time intervals, designated set A, set B, set C, set D, and set E. In other embodiments, there may be a different number of sets of recurring time intervals. Set A time intervals include N time intervals (time interval 1A 520, time interval 2A 530, . . . , time interval NA 540). Set B time intervals include N time intervals (time interval 1B 522, time interval 2B 532, . . . , time interval NB 542). Set C time intervals include N time intervals (time interval 1C 524, time interval 2C 534, . . . , time interval NC 544). Set D time intervals include N time intervals (time interval 1D 526, time interval 2D 536, . . . , time interval ND 546). Set E time intervals include N time intervals (time interval 1E 528, time interval 2E 538, . . . , time interval NE 548). In one example, N=100. In some other embodiments, N is a different positive integer, where N is greater than or equal to the number of sets of recurring time intervals.

Corresponding to the time intervals in set A there are channel A air link resources. The air link resources are frequency-time resources, e.g., sets of tone-symbols, where a tone-symbol is a tone for the duration of a symbol transmission time interval. Corresponding to time intervals (interval 1A 520, time interval 2A 530, . . . , time interval NA 540, there are channel A resources (550, 560, . . . , 570), respectively.

Corresponding to the time intervals in set B there are channel B air link resources. Corresponding to time intervals (interval 1B 522, time interval 2B 532, . . . , time interval NB 542, there are channel B resources (552, 562, . . . , 572), respectively.

Corresponding to the time intervals in set C there are channel C air link resources. Corresponding to time intervals (interval 1C 524, time interval 2C 534, . . . , time interval NC 544, there are channel C resources (554, 564, . . . , 574), respectively.

Corresponding to the time intervals in set D there are channel D air link resources. Corresponding to time intervals (interval 1D 526, time interval 2D 536, . . . , time interval ND 546, there are channel D resources (556, 566, . . . , 576), respectively.

Corresponding to the time intervals in set E there are channel E air link resources. Corresponding to time intervals (interval 1E 528, time interval 2E 538, . . . , time interval NE 548, there are channel E resources (558, 568, . . . , 578), respectively.

Figure 6:
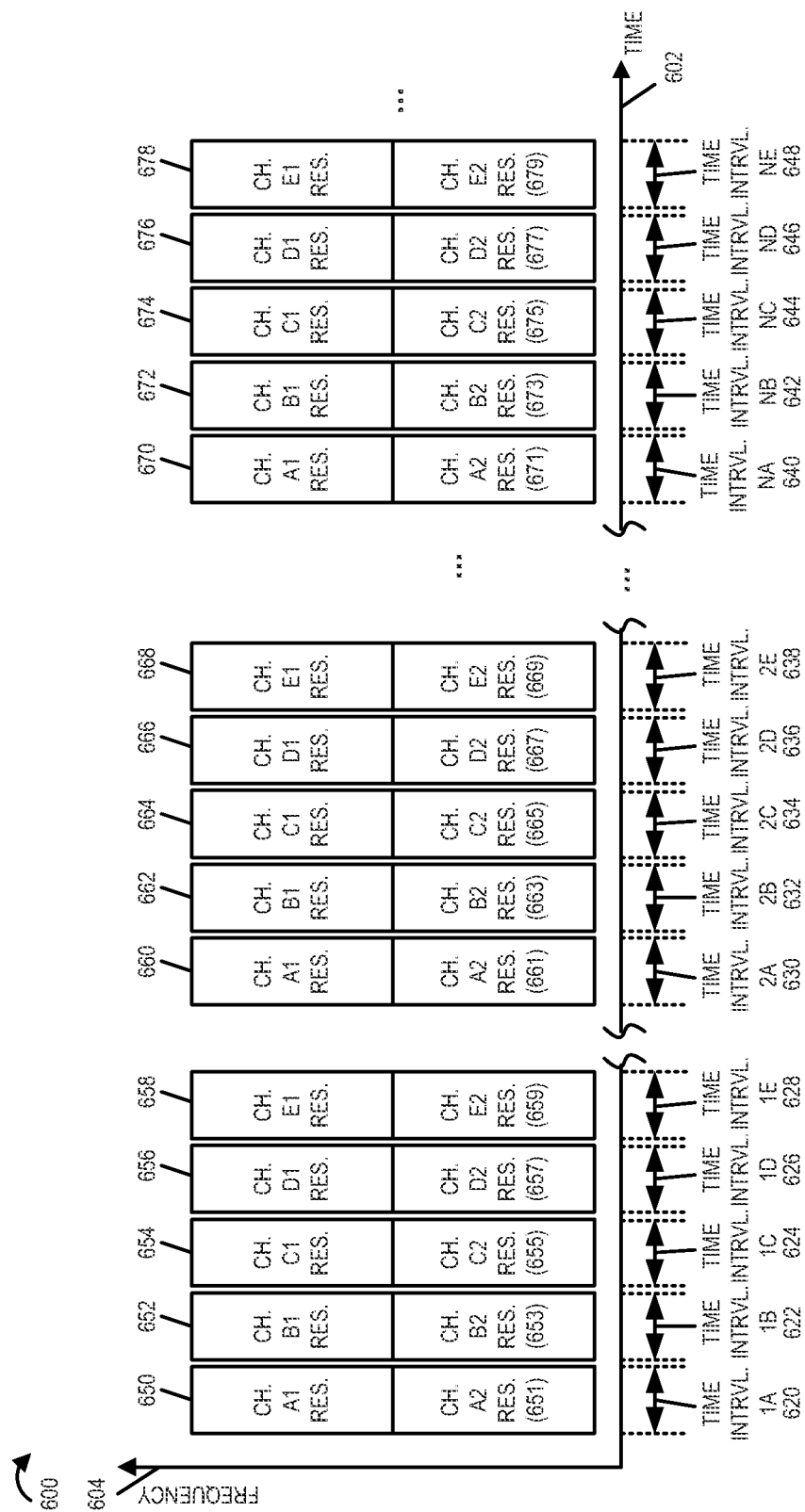
FIG. 6 is a drawing illustrating exemplary sets of recurring time intervals and exemplary air link resources in another exemplary recurring timing frequency structure.

FIG. 6 is a drawing 600 illustrating exemplary sets of recurring time intervals and exemplary air link resources in another exemplary recurring timing frequency structure. Horizontal axis 602 represents time, e.g., OFDM symbol transmission time intervals, and vertical axis 604 represents frequency, e.g., OFDM tones. In some embodiments, the exemplary recurring timing frequency structure of FIG. 6 is used by wireless communications devices in system 100 of FIG. 1, and/or by a wireless communications device 300 of FIG. 3 and/or by a wireless communications device implementing a method in accordance with flowchart 200 of FIG. 2.

In this example, there are five different sets of recurring time intervals, designated set A, set B, set C, set D, and set E. In other embodiments, there may be a different number of sets of recurring time intervals. Set A time intervals include N time intervals (time interval 1A 620, time interval 2A 630, . . . , time interval NA 640). Set B time intervals include N time intervals (time interval 1B 622, time interval 2B 632, . . . , time interval NB 642). Set C time intervals include N time intervals (time interval 1C 624, time interval 2C 634, . . . , time interval NC 644). Set D time intervals include N time intervals (time interval 1D 626, time interval 2D 636, . . . , time interval ND 646). Set E time intervals include N time intervals (time interval 1E 628, time interval 2E 638, . . . , time interval NE 648). In one example, N=100. In some other embodiments, N is a different positive integer, where N is greater than or equal to the number of sets of recurring time intervals.

Corresponding to the time intervals in set A there are resources corresponding to two channels, channel A1 air link resources and channel A2 air link resources. In other embodiments, there may be more than 2 channels corresponding to set A time intervals. The air link resources are frequency-time resources, e.g., sets of tone-symbols, where a tone-symbol is a tone for the duration of a symbol transmission time interval. Corresponding to time intervals (interval 1A 620, time interval 2A 630, . . . , time interval NA 640, there are channel A1 resources (650, 660, . . . , 670), respectively. Corresponding to time intervals (interval 1A 620, time interval 2A 630, . . . , time interval NA 640, there are channel A2 resources (651, 661, . . . , 671), respectively. The A1 channel maps to a higher set of tones than the A2 channel.

Corresponding to the time intervals in set B there are resources corresponding to two channels, channel B1 air link resources and channel B2 air link resources. In other embodiments, there may be more than 2 channels corresponding to set B time intervals. The air link resources are frequency-time resources, e.g., sets of tone-symbols, where a tone-symbol is a tone for the duration of a symbol transmission time interval. Corresponding to time intervals (interval 1B 622, time interval 2B 632, . . . , time interval NB 642, there are channel B1 resources (652, 662, . . . , 672), respectively. Corresponding to time intervals (interval 1B 622, time interval 2B 632, . . . , time interval NB 642, there are channel B2 resources (653, 663, . . . , 673), respectively. The B1 channel maps to a higher set of tones than the B2 channel.

Corresponding to the time intervals in set C there are resources corresponding to two channels, channel C1 air link resources and channel C2 air link resources. In other embodiments, there may be more than 2 channels corresponding to set C time intervals. The air link resources are frequency-time resources, e.g., sets of tone-symbols, where a tone-symbol is a tone for the duration of a symbol transmission time interval. Corresponding to time intervals (interval 1C 624, time interval 2C 634, . . . , time interval NC 644, there are channel C1 resources (654, 664, . . . , 674), respectively. Corresponding to time intervals (interval 1C 624, time interval 2C 634, . . . , time interval NC 644, there are channel C2 resources (655, 665, . . . , 675), respectively. The C1 channel maps to a higher set of tones than the C2 channel.

Corresponding to the time intervals in set D there are resources corresponding to two channels, channel D1 air link resources and channel D2 air link resources. In other embodiments, there may be more than 2 channels corresponding to set D time intervals. The air link resources are frequency-time resources, e.g., sets of tone-symbols, where a tone-symbol is a tone for the duration of a symbol transmission time interval. Corresponding to time intervals (interval 1D 626, time interval 2D 636, . . . , time interval ND 646, there are channel D1 resources (656, 666, . . . , 676), respectively. Corresponding to time intervals (interval 1D 626, time interval 2D 636, . . . , time interval ND 646, there are channel D2 resources (657, 667, . . . , 677), respectively. The D1 channel maps to a higher set of tones than the D2 channel.

Corresponding to the time intervals in set E there are resources corresponding to two channels, channel E1 air link resources and channel E2 air link resources. In other embodiments, there may be more than 2 channels corresponding to set E time intervals. The air link resources are frequency-time resources, e.g., sets of tone-symbols, where a tone-symbol is a tone for the duration of a symbol transmission time interval. Corresponding to time intervals (interval 1E 628, time interval 2E 638, . . . , time interval NE 648, there are channel E1 resources (658, 668, . . . , 678), respectively. Corresponding to time intervals (interval 1E 628, time interval 2E 638, . . . , time interval NE 648, there are channel E2 resources (659, 669, . . . , 679), respectively. The E1 channel maps to a higher set of tones than the E2 channel.

Figure 7:
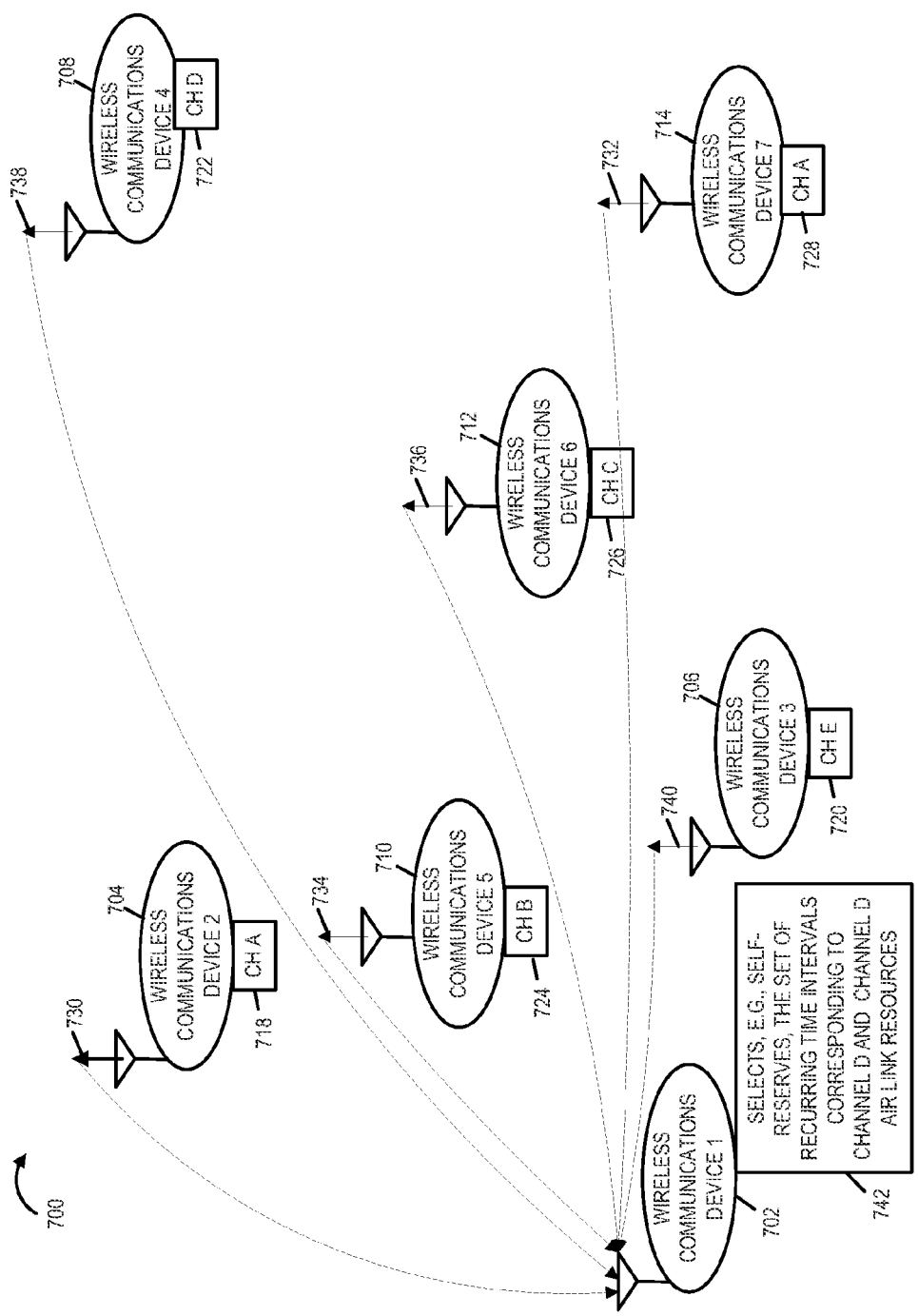
FIG. 7 illustrates an exemplary wireless communications device which selects, e.g., self-reserves, a set of recurring timing intervals which may be used concurrently by other devices, in accordance with an exemplary embodiment.
Figure 8:
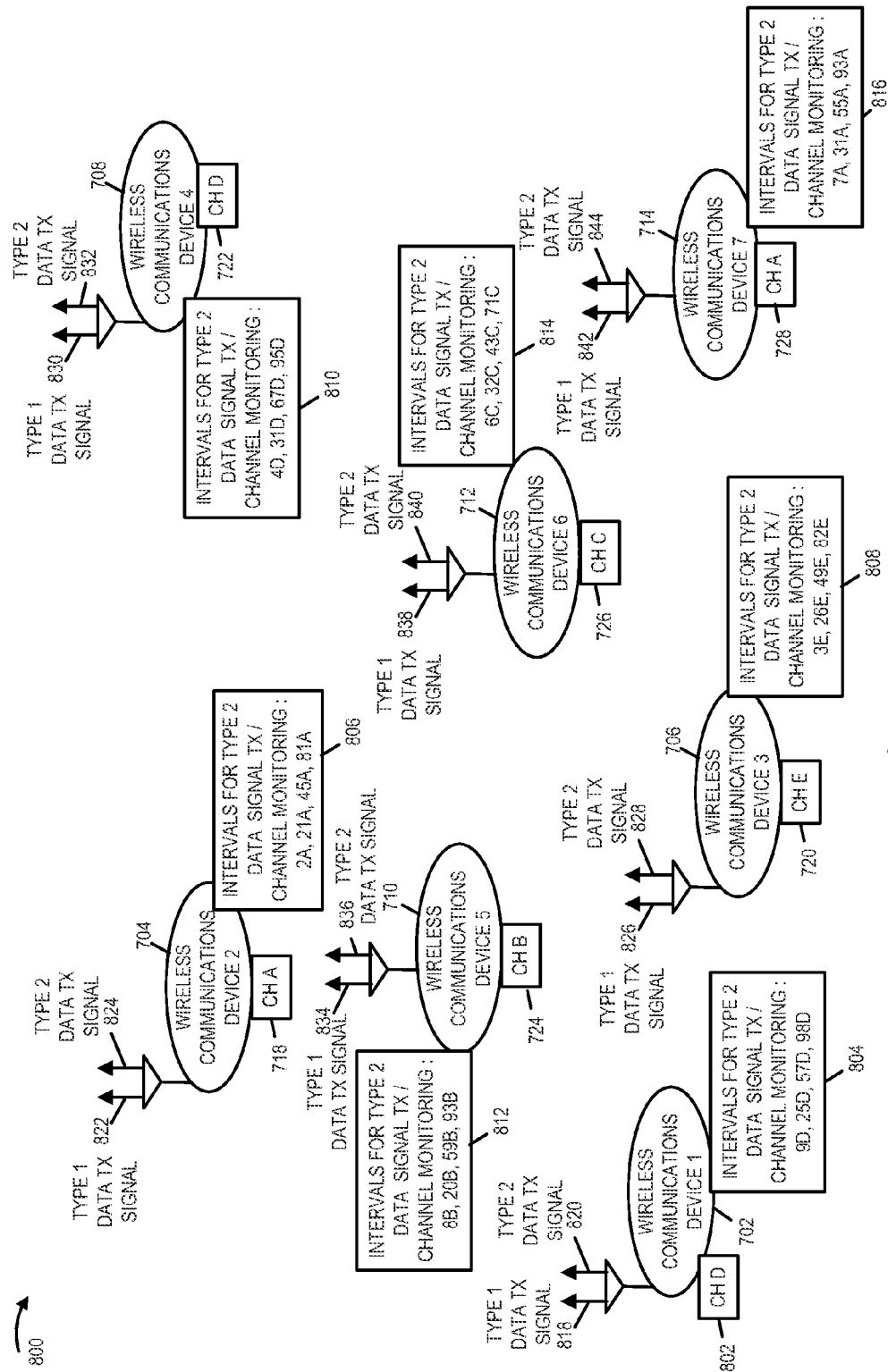
FIG. 8 illustrates exemplary wireless communications devices, which have each selected a particular exemplary set of recurring time intervals and corresponding set of air link resources, pseudo-randomly select particular intervals within their selected set of recurring time intervals to use to both transmit data and monitor its channel and further illustrates that the wireless communications devices transmit data signals during first type intervals and second type intervals, in accordance with an exemplary embodiment.
Figure 9:
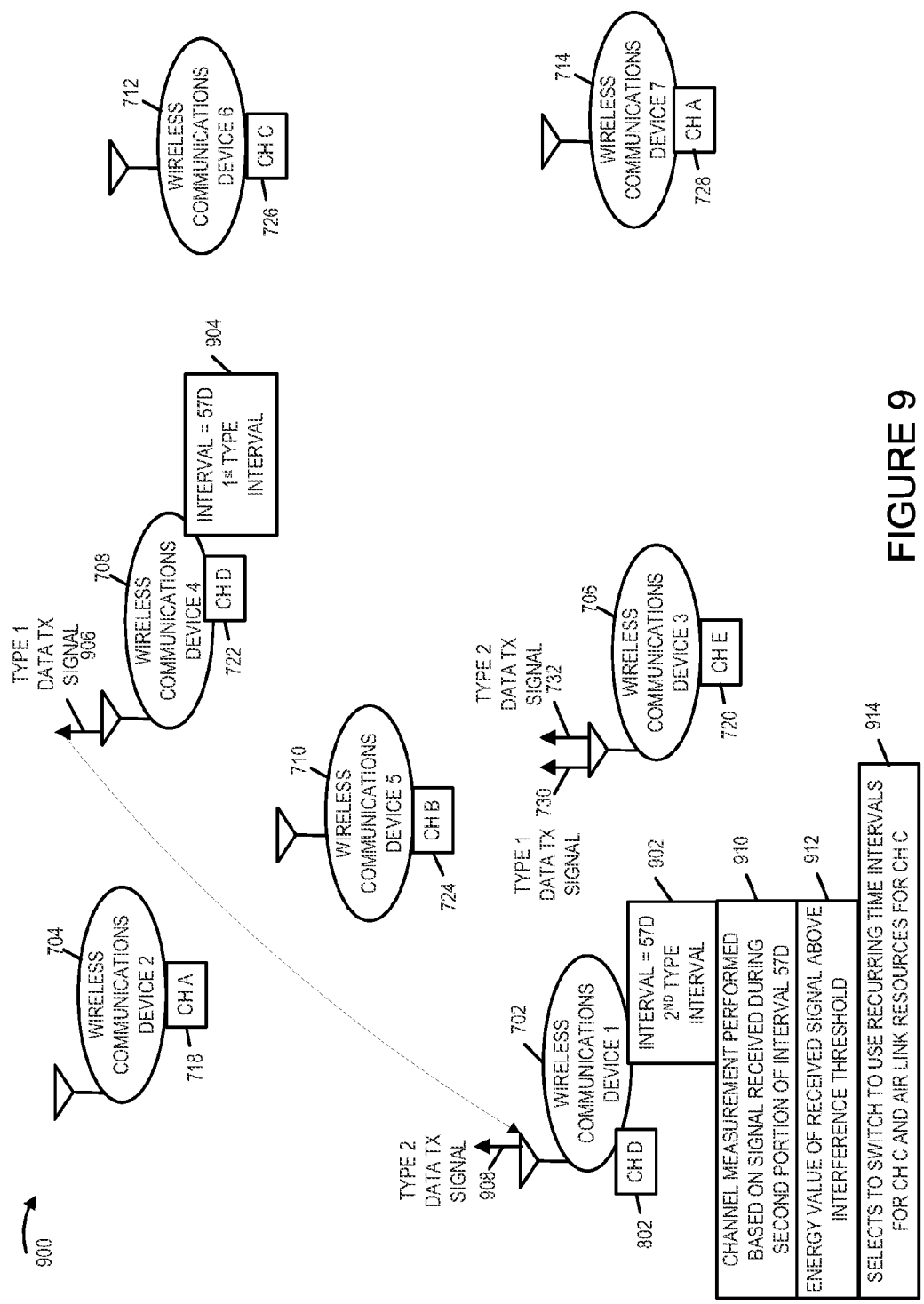
FIG. 9 illustrates an exemplary wireless communications device measuring its channel during an exemplary second type interval, detecting a signal from another wireless communications device which is using the same channel, measuring interference and deciding to switch to another set of recurring time intervals in accordance with an exemplary embodiment.

FIGS. 7-9 illustrate an example, in which an exemplary wireless communications device selects a set of recurring timing intervals which may be used concurrently by other devices, selects particular timing intervals within its selected set of recurring time interval in which to both transmit data and monitor its channel, transmits data during some of its time intervals, transmits data and monitors its channel during some of its time intervals, and changes to a different set of recurring time intervals based on detected interference on its channel exceeding a threshold. The exemplary wireless communications device may implement a method in accordance with flowchart 200 of FIG. 2 and/or be implemented in accordance with device 300 of FIG. 3 and/or include the assembly of modules 400 of FIG. 4.

In drawing 700 of FIG. 7, there are a plurality of wireless communications devices (wireless communications device 1 702, wireless communications device 2 704, wireless communications device 3 706, wireless communications device 4 708, wireless communications device 5 710, wireless communications device 6 712, wireless communications device 7 714). Consider for the example, that wireless communications devices (704, 706, 708, 710, 712, 714) have been operating in the area, and that wireless communications device 1 702 is new to the area, e.g., it has recently powered on. Further consider that the wireless communications devices are using a timing frequency structure in accordance with FIG. 5 where N=100. Further consider that devices (device 2 704, device 3 706, device 4 708, device 5 710, device 6 712, device 7 714) have previously selected and are presently using sets of time recurring time intervals (A, E, D, B, C, A), respectively and corresponding channel (A, E, D, B, C, A), air link resources, respectively, as indicated by boxes (718, 720, 722, 724, 726, 728), respectively.

Device 2 704 transmits data signals 730 during a set A time interval, e.g., interval 520, using a channel A air link resource, e.g., resource 550. Device 7 714 transmits data signals 732 during the same set A time interval using the same channel A air link resource. Device 5 710 transmits data signals 734 during a set B time interval, e.g., interval 522, using a channel B air link resource, e.g., resource 552. Device 6 712 transmits data signals 736 during a set C time interval, e.g., interval 524, using a channel C air link resource, e.g., resource 554. Device 4 708 transmits data signals 738 during a set D time interval, e.g., interval 526, using a channel D air link resource, e.g., resource 556. Device 3 706 transmits data signals 740 during a set E time interval, e.g., interval 528, using a channel E air link resource, e.g., resource 558.

Wireless communications device 1 702 receives the transmitted signals (730, 732, 734, 736, 738, 740), measures received energy on each of the channels and selects a set of recurring time intervals based on the measured received energy. In this example, wireless communications device 1 702 selects, e.g., self-reserves, set D of recurring time intervals corresponding and the channel D air link resources, as indicated by box 742.

Drawing 800 of FIG. 8 illustrates that each of the wireless communications devices transmits type 1 data transmission signals during some of its reserved time intervals and type 2 data transmission signals during some of its reserved time intervals. In type 1 intervals, the wireless communications device transmits data. In an interval selected, e.g., pseudo-randomly selected, for type 2 data transmission signaling, the wireless communications device transmits data during a first portion of the interval and refrains from transmitting and performs a channel measurement during the second portion of the interval. Different wireless communications device using the same set of recurring time intervals, may, and sometimes do select different ones of its reserved intervals to be second type intervals, e.g., in accordance with different interval selection functions, e.g., based on a different pseudo random number generator and/or a different seed value.

Wireless communications device 1 702 has previously selected and is presently using set D of time recurring time intervals and corresponding channel D air link resources as indicated by box 802. In this example, wireless communications device 1 702 has pseudo-randomly selected that intervals for type 2 data signal transmissions/channel monitoring are to be intervals: 9D, 25D, 57D, and 98D, as indicated by block 804. The other intervals (1D, . . . , 8D, 10D, . . . , 24D, 26D, . . . , 56D, 58D, . . . , 97D, 99D and 100D) in its reserved set of recurring time intervals are to be type 1 intervals.

In this example, wireless communications device 2 704 has pseudo-randomly selected that intervals for type 2 data signal transmissions/channel monitoring are to be intervals: 2A, 21A, 45A, and 81A, as indicated by block 806. The other intervals (1A, 3A, . . . , 20A, 22A, . . . , 44A, 46A, . . . , 80A, 82A, . . . , 100A) in its reserved set of recurring time intervals are to be type 1 intervals.

In this example, wireless communications device 3 706 has pseudo-randomly selected that intervals for type 2 data signal transmissions/channel monitoring are to be intervals: 3E, 26E, 49E, and 82E, as indicated by block 808. The other intervals (1E, 2E, 4E, . . . , 25E, 27E, . . . , 48E, 50E, . . . , 81E, 83E, . . . , 100E) in its reserved set of recurring time intervals are to be type 1 intervals.

In this example, wireless communications device 4 708 has pseudo-randomly selected that intervals for type 2 data signal transmissions/channel monitoring are to be intervals: 4D, 31D, 67D, and 95D, as indicated by block 810. The other intervals (1D, . . . , 3D, 5D, . . . , 30D, 32D, . . . , 66D, 68D, . . . , 94D, 96D, . . . , 100D) in its reserved set of recurring time intervals are to be type 1 intervals.

In this example, wireless communications device 5 710 has pseudo-randomly selected that intervals for type 2 data signal transmissions/channel monitoring are to be intervals: 8B, 20B, 59B, and 93B, as indicated by block 812. The other intervals (1B, . . . , 7B, 9B, . . . , 19B, 21B, . . . , 58B, 60B, . . . , 92B, 94B, . . . , 100B) in its reserved set of recurring time intervals are to be type 1 intervals.

In this example, wireless communications device 6 712 has pseudo-randomly selected that intervals for type 2 data signal transmissions/channel monitoring are to be intervals: 6C, 32C, 43C, and 71C, as indicated by block 814. The other intervals (1C, . . . , 5C, 7C, . . . , 31C, 33C, . . . , 42C, 44C, . . . , 70C, 72C, . . . , 100C) in its reserved set of recurring time intervals are to be type 1 intervals.

In this example, wireless communications device 7 714 has pseudo-randomly selected that intervals for type 2 data signal transmissions/channel monitoring are to be intervals: 7A, 31A, 55A, and 93A, as indicated by block 816. The other intervals (1A, . . . , 6A, 8A, . . . , 30A, 32A, . . . , 54A, 56A, . . . , 92A, 94A, . . . , 100A) in its reserved set of recurring time intervals are to be type 1 intervals.

In some embodiments, a wireless communications device selects which of its reserved timing intervals are to be type 2 intervals for a large number of upcoming intervals. In some embodiments, a wireless communications device selects whether an upcoming individual interval is to be a type 2 interval just prior to the interval. In this example, each wireless communications device has selected four type 2 intervals out of 100 intervals. In some embodiments, the rate, e.g., average rate, of type 2 intervals is a function of the application. In some embodiments, type 2 intervals, for a particular device, are evenly spaced. In some embodiments, the rate of type 2 intervals can, and sometimes does change dynamically, e.g., in response to a change in application and/or conditions by the wireless communications device. In some embodiments, different wireless communications in the same system may, and sometimes do select different numbers of type 2 intervals over a given time.

Exemplary type 1 data transmission signals, corresponding to type 1 intervals and type 2 data transmission signals corresponding to type data intervals have been indicated for each of the wireless communications devices in drawing 800. Device 1 702 transmits type 1 data transmission signal 818 during one of its type 1 intervals. Device 1 702 transmits type 2 data transmission signal 820 during one of its type 2 intervals. Device 2 704 transmits type 1 data transmission signal 822 during one of its type 1 intervals. Device 2 704 transmits type 2 data transmission signal 824 during one of its type 2 intervals. Device 3 706 transmits type 1 data transmission signal 826 during one of its type 1 intervals. Device 3 706 transmits type 2 data transmission signal 828 during one of its type 2 intervals. Device 4 708 transmits type 1 data transmission signal 830 during one of its type 1 intervals. Device 4 708 transmits type 2 data transmission signal 832 during one of its type 2 intervals. Device 5 710 transmits type 1 data transmission signal 834 during one of its type 1 intervals. Device 5 710 transmits type 2 data transmission signal 836 during one of its type 2 intervals. Device 6 712 transmits type 1 data transmission signal 838 during one of its type 1 intervals. Device 6 712 transmits type 2 data transmission signal 840 during one of its type 2 intervals. Device 7 714 transmits type 1 data transmission signal 842 during one of its type 1 intervals. Device 7 714 transmits type 2 data transmission signal 844 during one of its type 2 intervals.

Consider that operation runs through interval 57C, with devices transmitting during their type 1 intervals and transmitting/monitoring their own channel during their type 2 intervals, and that the wireless communications devices have determined that measured interference is below a threshold and have continued to use their selected set of time intervals and corresponding channels. The devices may be moving as time progresses.

Further, consider that the devices are situated as shown in drawing 900 during time interval 57D. Wireless communications device 1 702 has pseudo-randomly selected interval 57D to be one of its second type intervals, as indicated by block 902. Interval 57D is a first type interval from the perspective of wireless communications device 4 708, as indicated by block 904. Note that wireless communications device 4 708 is closer to wireless communications device 1 702 in drawing 900 of FIG. 9 than in drawing 700 of FIG. 7. During time interval 57D, wireless communications device 4 708 transmits type 1 data signal 906 during the entire interval. During a first portion of interval 57D, wireless communications device 1 702 transmits type 2 data signal 908. During the second portion of interval 57D, wireless communications device 1 702 receives signal 906 from wireless communications device 4 708, measures the strength of the received signal as part of performing a channel measurement, as indicated by block 910. Wireless communications device 1 702 compares the measured received signal strength to an interference threshold and determines that the energy value of the received signal is above the interference threshold as indicated by block 912. In response to the determination that the energy value of the received signal is above the interference threshold, wireless communications device 1 702 selects a different set of recurring time intervals to use. In this example, wireless communications device 1 702 selects to use the recurring time intervals for channel C and the air link resources for channel C, as indicated by block 914. Note that in this example, wireless communications device 6 712, which is using channel C is now the device which is the further away from wireless communications device 1 702.

Figure 10:
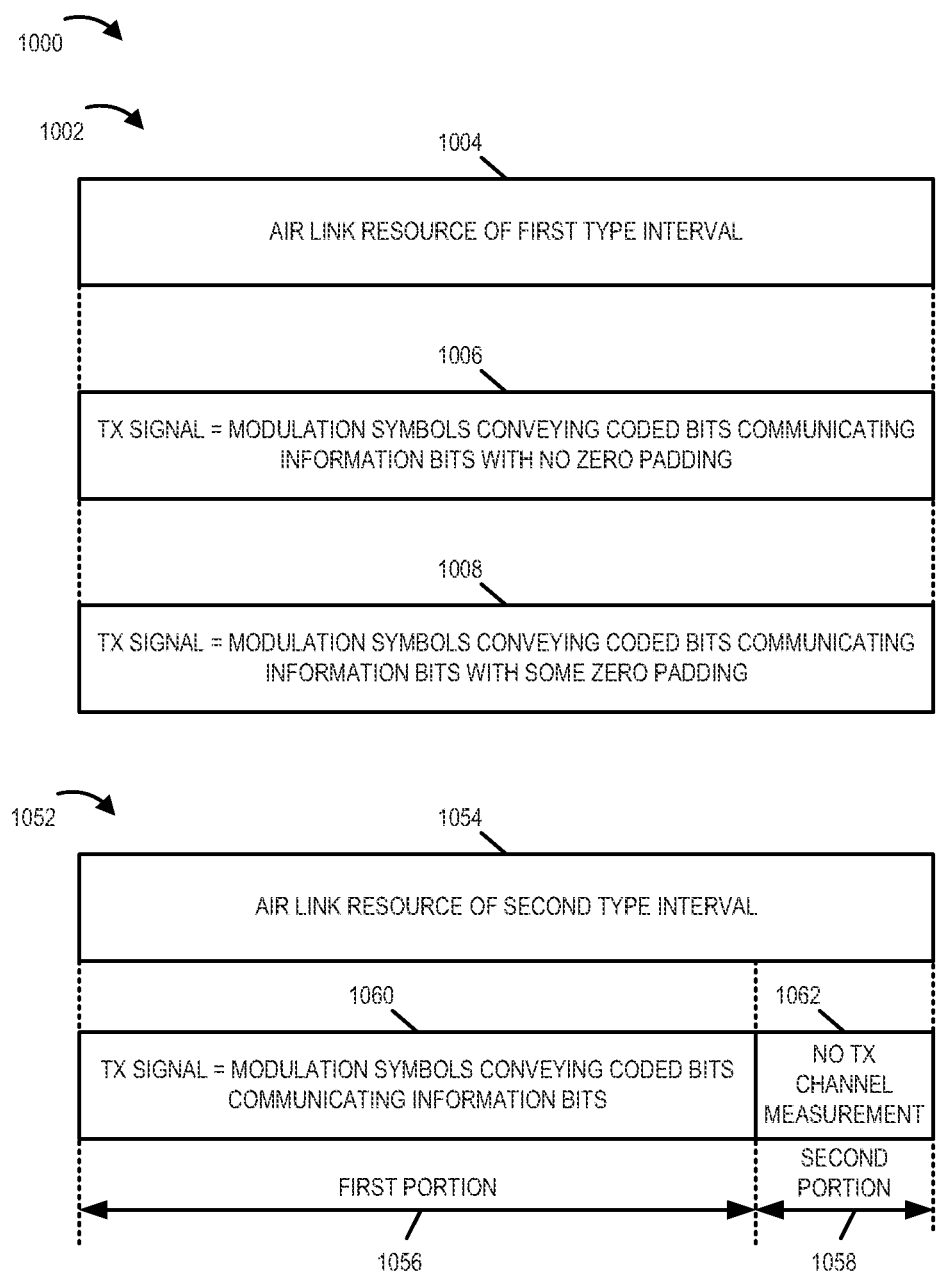
FIG. 10 is a drawing illustrating two exemplary interval types in accordance with an exemplary embodiment.

FIG. 10 is a drawing 1000 illustrating two exemplary interval types in accordance with an exemplary embodiment. Upper drawing portion 1002 refers to the first type interval. In this exemplary embodiment, the air link resources of a first type interval 1004 are fully utilized by the wireless communications device transmitting into its first type interval. In the example illustrated by block 1006, the wireless communications device's transmit signal carries modulations symbols conveying coded bits communicating information bits with no zero padding. In the alternative example illustrated by block 1008, the wireless communications device's transmit signal carries modulations symbols conveying coded bits communicating information bits with some zero padding.

Lower drawing portion 1052 refers to the second type interval. In this exemplary embodiment, a second type time interval and the air link resources of a second type interval 1054 are partitioned into a first portion and a second portion. During the first portion of the second type time interval 1056, the wireless communications device uses its first portion air link resources to transmit signal carrying modulation symbols conveying coded bits communicating information bits, as indicated by block 1060. During the second portion of the second type time interval 1058, the wireless communications device refrains from transmitting and uses it second portion air link resources to measure its channel and detect interference from other devices which may be using the same channel and happen to be transmitting because the other device considers the interval a first type interval, as indicated by block 1062.

It should be noted that the intentional padding in first type interval, when a communications device, does not otherwise have enough data to communicate in its first type interval ensures that the wireless communicates device is transmitting during the end of the first type interval, when another device which is considering the same interval as a second type interval is performing its channel measurement.

Figure 11:
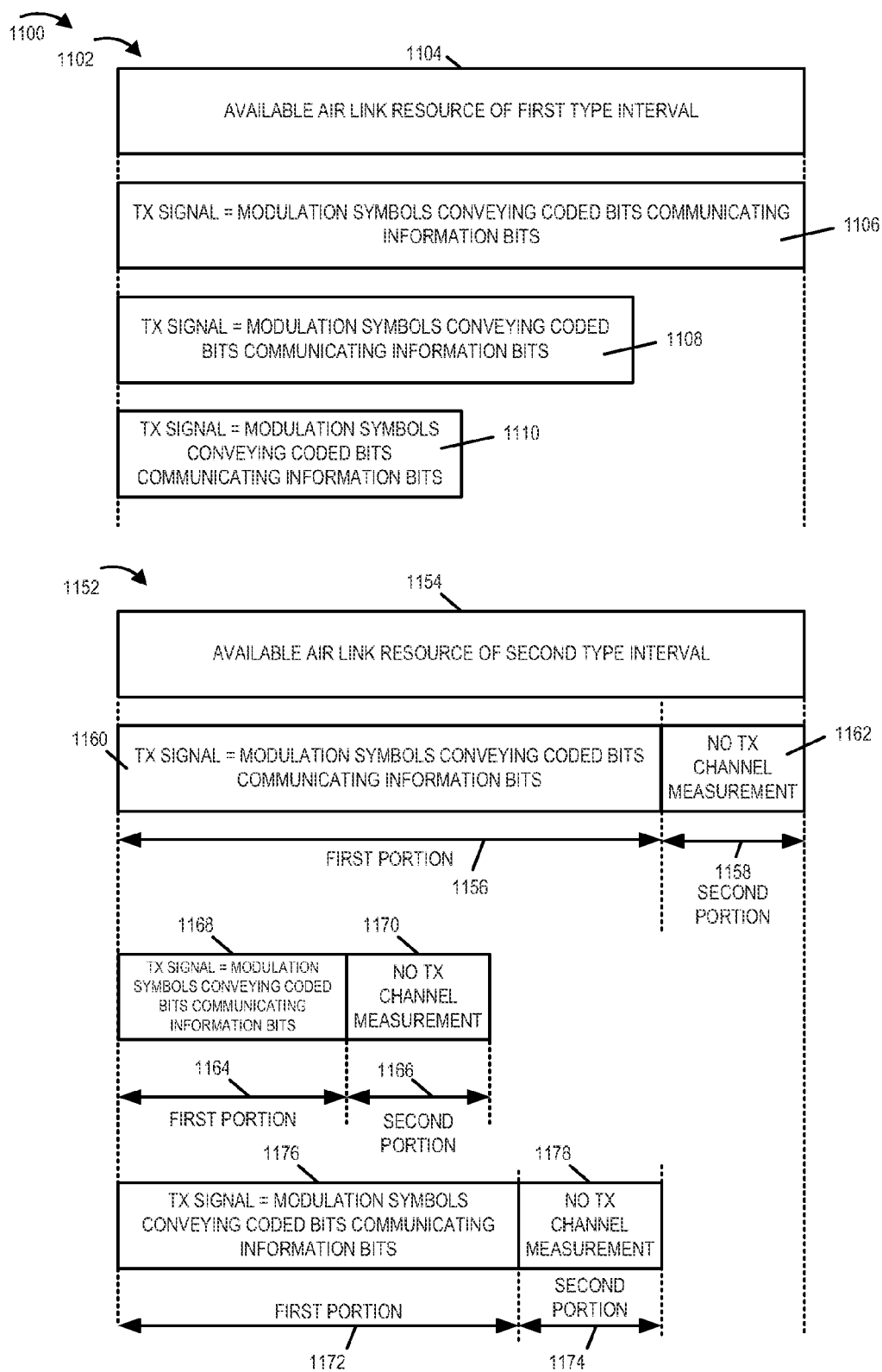
FIG. 11 is a drawing illustrating two exemplary interval types in accordance with another exemplary embodiment.

FIG. 11 is a drawing 1100 illustrating two exemplary interval types in accordance with another exemplary embodiment. Upper drawing portion 1102 refers to the first type interval. In this exemplary embodiment, the available air link resources of a first type interval 1104 may be utilized to different degrees by the wireless communications device transmitting into its first type interval, e.g., depending upon how much information it wants to communicate. In the example illustrated by block 1106, the wireless communications device's transmit signal carries modulations symbols conveying coded bits communicating information bits and fully utilizes the available air link resources of the first time interval. In the next example illustrated by block 1108, the wireless communications device's transmit signal carries modulations symbols conveying coded bits communicating information bits and the wireless communications device uses approximately 75% of the available air link resources of the first type interval 1104. In the next example illustrated by block 1110 the wireless communications device's transmit signal carries modulations symbols conveying coded bits communicating information bits and the wireless communications device uses approximately 50% of the available air link resources of the first type interval 1104.

Lower drawing portion 1152 refers to the second type interval. In this exemplary embodiment, the first portion of a second type time interval is determined according to a duration determination function, and the duration of the first portion of the second type time interval varies with time. The available air link resource of a second type time interval are represented by block 1154.

In one case, the duration of the first portion of the second time interval is 1156 and the duration of second portion of the second time interval is 1158. During the first portion of the second type time interval, the wireless communications device uses its first portion air link resources to transmit signal carrying modulation symbols conveying coded bits communicating information bits, as indicated by block 1160. During the second portion of the second type time interval, the wireless communications device refrains from transmitting and uses it second portion air link resources to measure its channel and detect interference from other devices which may be using the same channel and happen to be transmitting because the other device considers the interval a first type interval, as indicated by block 1162.

In another case, the duration of the first portion of the second time interval is 1164 and the duration of second portion of the second time interval is 1166. During the first portion of the second type time interval the wireless communications device uses its first portion air link resources to transmit signal carrying modulation symbols conveying coded bits communicating information bits, as indicated by block 1168. During the second portion of the second type time interval, the wireless communications device refrains from transmitting and uses it second portion air link resources to measure its channel and detect interference from other devices which may be using the same channel and happen to be transmitting at that time because the other device considers the interval a first type interval, as indicated by block 1170.

In another case, the duration of the first portion of the second time interval is 1172 and the duration of second portion of the second time interval is 1174. During the first portion of the second type time interval the wireless communications device uses its first portion air link resources to transmit signal carrying modulation symbols conveying coded bits communicating information bits, as indicated by block 1176. During the second portion of the second type time interval, the wireless communications device refrains from transmitting and uses it second portion air link resources to measure its channel and detect interference from other devices which may be using the same channel and happen to be transmitting at that time because the other device considers the interval a first type interval, as indicated by block 1178.

In this approach of FIG. 11, the length of the transmission in the first time intervals can vary from one interval to another, with the transmitting wireless terminal not having to waste air link resources and power transmitting zero padding. The variable length first portions in second type intervals accommodate the placement of the second portion used for channel measurement at different points within the interval. Some channel measurements may miss a particular short length transmission. However, averaging can be, and sometimes is used, to get a more precise measurement of the level of interference on the channel. In this example, channel measurement using resource 1170 would have detected transmissions 1106, 1108, and 1110; channel measurement using resource 1178 would have detected transmissions 1106 and 1108; and channel measurement using resource 1162 would have detected transmissions 1106.

Various features and/or aspects of some embodiments are further described below. Various embodiments are directed to method and/or apparatus to improve the performance of synchronous IEEE 802.11 MAC based systems to broadcast messages periodically. In some embodiments, a wireless communications device, e.g., a wireless terminal, senses the energy in the resource occupied by the device in some intervals, e.g., update intervals, after transmitting for a shorter duration in the same slot.

Wireless terminals, e.g., in an ad hoc peer to peer communications network, often select a set of recurring communications resources, e.g., time intervals or combination of time intervals and frequency resources, to use for transmitting signals, e.g., data. Even though the initial selection of resources may be made based on channel measurements, while transmitting on the set of resources, the transmitting device cannot measure the interference on the channel, e.g., interference from other devices using the same resources and/or other interference which may be present on the selected set of recurring communications resources.

While the other device or devices using the same set of resources may be remote at the time of the initial sensing, device location may change over time resulting in devices using the same resource coming into proximity with each other as the position of one or more devices changes.

While a device may forgo using one of the time intervals for transmission and make channel measurements during the time interval, the spacing between time intervals used by the communications device may result in an undesirable latency and/or be wasteful in that an entire time interval does not get used in such an embodiment for data transmission which can be undesirable.

In accordance with one aspect, a device which has selected a set of recurring resources, e.g., time intervals, to use for transmission purposes selects, pseudo randomly, one or more of the selected time intervals for channel measurement purposes and refrains from transmitting during a portion of the one or more time intervals selected for channel measurement purposes. The pseudo random selection makes it likely that multiple devices using the same resource will not select to perform the channel resource monitoring at the same time. Thus, there is a good chance that the other devices using the resource will transmit during the period of time in which monitoring is performed allowing for a more accurate measurement of channel conditions likely to be encountered when the resource is used. During a portion of the time interval selected by the communications device for channel measurement purposes, the communications device refrains from transmitting and measures channel conditions. Some or all of the remaining portion of the interval is used for transmission purposes but the transmission of data is implemented differently in terms of the amount of data, transmission power and/or coding used as compared to the data transmitted during the time intervals in which data is transmitted but which are not used for channel measurement purposes.

In some embodiments, different devices use different seeds, e.g., device identifiers or other values, when selecting time intervals in which channel measurements are performed. To increase the randomization of the intervals selected for channel measurements, the time intervals, e.g., slots, used for measurement purposes are hopped over time.

To make the portion of the time interval available for channel measurement purposes, the device limits the amount of data to be transmitted in the time interval, uses a higher modulation and/or uses a higher coding rate. Data is transmitted during the portion of the interval which is not used for channel measurement purposes. Thus, during the time interval selected for channel measurement purposes the device uses a different data transmission constraint, different modulation scheme, different coding rate, and/or different power level from other time intervals in the set of recurring time intervals being used by the wireless terminal. The time interval which the device selects for purposes of using a portion for channel measurement purposes is selected in a pseudo random manner. Other devices in the system use a different pseudo random function or pseudo random seed for purposes of selecting the time interval in which channel measurements are made. Accordingly, individual devices are likely to perform measurements at times other devices are transmitting in a normal manner making the channel measurement more reliable in terms of taking into consideration from interference transmissions from other devices in the system.

While using as much of a time interval, e.g., slot, as possible to transmit data and minimize the amount of time used for channel measurements is desirable from the perspective of maximizing the amount of data which can be transmitted, repeatedly performing the measurements at the same point within a slot may result in a channel estimate which does not accurately reflect the channel characteristics during the entire slot measured. For example, some other devices might routinely transmit in a first half of a slot and finish their data transmission before the start of the second half of the slot. In order to increase the chances that channel measurements provide a relatively accurate reflection of channel conditions, in some embodiments the point at which a measurement is made in a slot selected for channel measurement purposes changes over time, e.g., from one selected measurement time interval to the next, with measurements corresponding to a particular recurring time slot being averaged over time. For example, during a first measurement of a particular time slot, data transmission may be limited to half of the slot in which the measurement is to be performed and the measurement is performed at the start of the second half of the slot. When a measurement is made in the particular time slot of a subsequent time period, the data transmission may be limited to the first 75% of the slot with the measurement being made in the last 25% of the slot. While in another subsequent time period of the particular recurring time slot the data transmission is limited to 25% of the time slot and the measurement is made, e.g., at the end of the data transmission in the first 25% of the slot. Thus, in some embodiments the duration of data transmissions in slots used for measurements is intentionally varied with time. The variation in the duration may be pseudo random to decrease the probably that multiple devices, e.g., peer to peer devices, implement the same changes in how transmission are constrained and precisely where within the recurring time slots the channel measurements are performed.

Based on channel measurements, a device may decide that the current selected set of recurring communications resources has interference which is unacceptable, e.g., exceeds a threshold, and may switch to a different set of recurring resources, e.g., a different time interval or a different time interval and channel in the case where a device may select between multiple communications channels which are available during a given time period.

Since a device implementing the method makes measurements during a limited portion of a time interval while transmitting data during the other portion, an entire transmission time interval need not be skipped. Thus, short data transmissions requiring low latency can be satisfied during the portion of the transmission interval which is used. Larger data transmissions can also be satisfied, e.g., the same amount of data may be transmitted during the utilized portion of a transmission interval as is transmitted during other intervals but potentially with a higher risk of some errors due to lower redundancy than during time intervals in which the full time interval is used for the transmission of data. The use of higher transmission power during the portion of the transmission interval which is used reduces the risk of transmission errors during the portion in which data is transmitted as compared to the risk of errors which would be present if data was transmitted at the same power level used during transmission time intervals in which the full interval is used for data transmission purposes. The total transmission power used during time intervals in which channel measurements are made is constrained, in some embodiments to be equal or less than the amount total transmission power used during time intervals in which transmission occupy the full transmission time interval.

In some embodiments, an interval being used by a node, e.g., a wireless communications device for transmission and channel measurement is sometimes referred to as an update interval. In some embodiments, during an update interval, the node transmits for a shorter duration in its primary resource by using one or more or all of the following methods:

1. Higher code rate,
2. Higher modulation, and
3. Shorter packet length.

In various embodiments, this transmission is performed at the beginning of the resource, and hence, the synchronous behavior obtained by injecting packets at specific times is not affected. During the rest of the slot duration, the node senses the channel on the primary resource. The sensing on non-primary resources can be performed as before.

In some embodiments, the update interval sequence is chosen by each node randomly or pseudo randomly so that the probability of two nodes choosing same update interval is small. The frequency of this update is a parameter that can be changed based on the response time required by the application. In some embodiments, the frequency of this update parameter can be, and sometime is, changed dynamically, e.g., based on the response time required by the application.

Figure 12:
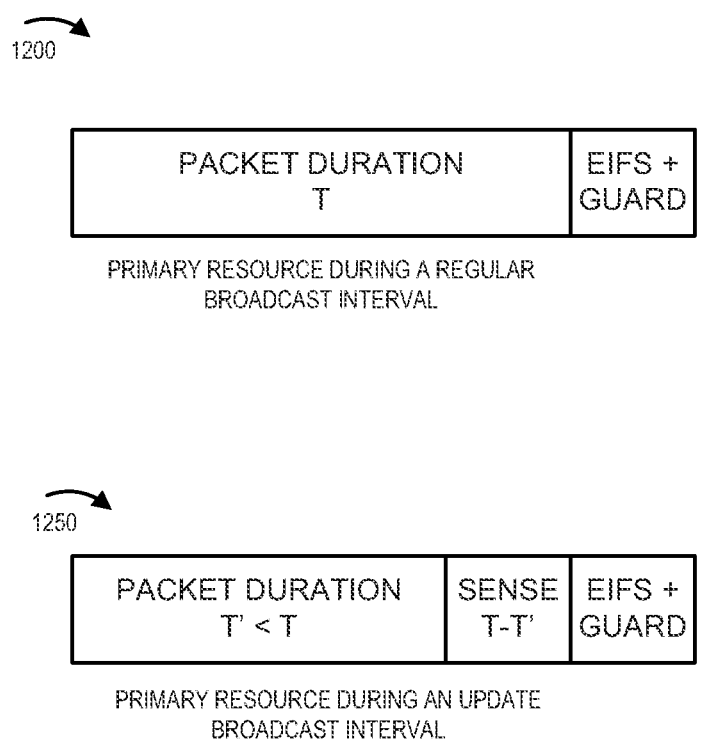
FIG. 12 illustrates an exemplary primary resource during a regular broadcast interval and an exemplary primary resource during an update broadcast interval in accordance with an exemplary embodiment.

Drawing 1200 of FIG. 12 illustrates an exemplary primary resource during a regular broadcast interval. Drawing 1250 illustrates an exemplary primary resource during an update broadcast interval.

If packet lengths, e.g., in bytes, are fixed, then a higher data rate or constellation size can be, and in some embodiments is, used to reduce the packet duration. Most systems including IEEE 802.11 have multiple constellation and rate vectors to choose from.

If packet lengths are variable, shorter packets can be, and in some embodiments, are, used during update intervals in addition to the possibility of using a higher data rate or modulation. In order to obtain better sensing, if packet duration is less than T during a regular broadcast interval, in some embodiments, this packet is zero-padded such that the packet duration is long enough for other nodes to sense this transmission.

Numerous variations on the above described methods and apparatus are possible.

In various embodiments a device, e.g., a mobile wireless communications device supporting peer to peer signaling in system 100 of FIG. 1, and/or communications device 300 of FIG. 3, and/or one of the wireless communications devices of FIG. 7-9 and/or of any of the Figures includes a module corresponding to each of the individual steps and/or operations described with regard to any of the Figures in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile nodes such as mobile terminals supporting peer to peer communications, stationary nodes supporting peer to peer communications, other types of wireless communications devices, access points such as base stations, network nodes, and/or communications systems. Various embodiments are also directed to methods, e.g., method of controlling and/or operating, mobile nodes, stationary nodes, access points such as base stations, network nodes, and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments, nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple, or all of the steps of one or more methods of the invention.

In some embodiments, the processor or processors, e.g., CPUs, of one or more devices, e.g., communications nodes such as wireless terminals, access nodes and/or network nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., a communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts, and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first communications device in a system where communications resources may be used by multiple devices at the same time, the method comprising:
    transmitting data, from the first communications device, during a first time interval in a set of recurring time intervals corresponding to said first device;
    pseudo randomly selecting, in the first communications device, a second time interval in said set of recurring time intervals to be used as a combined data transmission and channel measurement time interval;
    transmitting data, from the first communications device, during a first portion of the second time interval; and
    performing, at the first communications device, a channel measurement during a second portion of the second time interval in said set of recurring time intervals, said second portion of the second time interval being a period of time in which said first communications device does not transmit.

2. The method of claim 1, wherein transmitting during a first portion of the second time interval includes:
    controlling a transmitter to perform at least one of: transmitting a shorter packet than during the first time interval, transmitting data using a second modulation scheme that communicates a higher number of bits per modulation symbol than a first modulation scheme used during said first time interval or transmitting data at a higher coding rate than during said first time interval.

3. The method of claim 2, further comprising:
    determining the duration of the first portion of the second time interval according to a duration determination function.

4. The method of claim 3, further comprising:
    determining a duration of a first portion of a subsequent second time interval according to said function which varies with time, said first portion of the subsequent second time interval having a different duration than the first portion of said second time interval; and
    performing a channel measurement during a second portion of the subsequent second time interval in said set of recurring time intervals, said second portion of the subsequent second time interval being a period of time in which said first communications device does not transmit.

5. The method of claim 4, further comprising:
    averaging channel measurements obtained from different second time intervals which occur over a period of time to produce an average channel estimate for second time intervals.

6. The method of claim 5, wherein said first portion of time is located at the start of the second time interval and the second portion of time is located at the end of the second time interval.

7. The method of claim 6, wherein the second portion of time is shorter than said first portion of time.

8. The method of claim 1,
    wherein said channel measurement is a received signal energy measurement;
    wherein said first set of recurring time intervals is one of a plurality of sets of recurring time intervals which the first communications device may reserve, the method further comprising:

comparing a measured signal energy value to an interference threshold; and selecting a different set of recurring time intervals to use when said measured signal energy exceeds said interference threshold.

9. The method of claim 8, wherein selecting a different set of recurring time intervals includes selecting a set of communications resources to use during said selected different set of recurring time intervals.

10. A first communications device comprising:
means for transmitting data during a first time interval in a set of recurring time intervals corresponding to said first device;
means for pseudo randomly selecting a second time interval in said set of recurring time intervals to be used as a combined data transmission and channel measurement time interval;
means for transmitting data during a first portion of the second time interval; and
means for performing a channel measurement during a second portion of the second time interval in said set of recurring time intervals, said second portion of the second time interval being a period of time in which said first communications device does not transmit.

11. The first communications device of claim 10, wherein said means for transmitting during a first portion of the second time interval includes:
means for controlling a transmitter to perform at least one of: transmitting a shorter packet than during the first time interval, transmitting data using a second modulation scheme that communicates a higher number of bits per modulation symbol than a first modulation scheme used during said first time interval or transmitting data at a higher coding rate.

12. The first communications device of claim 11, further comprising:
means for determining the duration of the first portion of the second time interval according to a duration determination function.

13. The first communications device of claim 12, further comprising:
means for determining a duration of a first portion of a subsequent second time interval according to said function which varies with time, said first portion of the subsequent second time interval having a different duration than the first portion of said second time interval; and
means for performing a channel measurement during a second portion of the subsequent second time interval in said set of recurring time intervals, said second portion of the subsequent second time interval being a period of time in which said first communications device does not transmit.

14. The first communications device of claim 13, further comprising:
means for averaging channel measurements obtained from different second time intervals which occur over a period of time to produce an average channel estimate for second time intervals.

15. A computer program product for use in a first wireless communications device, the computer program product comprising:
a non-transitory computer readable medium comprising:
code for causing at least one computer to transmit data during a first time interval in a set of recurring time intervals corresponding to said first device;
code for causing said at least one computer to pseudo randomly select a second time interval in said set of recurring time intervals to be used as a combined data transmission and channel measurement time interval;
code for causing said at least one computer to transmitting data during a first portion of the second time interval; and
code for causing said at least one computer to perform a channel measurement during a second portion of the second time interval in said set of recurring time intervals, said second portion of the second time interval being a period of time in which said first communications device does not transmit.

16. A first communications device comprising:
at least one processor configured to:
transmit data during a first time interval in a set of recurring time intervals corresponding to said first device;
pseudo randomly select a second time interval in said set of recurring time intervals to be used as a combined data transmission and channel measurement time interval;
transmit data during a first portion of the second time interval; and
perform a channel measurement during a second portion of the second time interval in said set of recurring time intervals, said second portion of the second time interval being a period of time in which said first communications device does not transmit; and
memory coupled to said at least one processor.

17. The first communications device of claim 16, wherein said at least one processor is configured to control a transmitter to perform at least one of:
transmitting a shorter packet than during the first time interval, transmitting data using a second modulation scheme that communicates a higher number of bits per modulation symbol than a first modulation scheme used during said first time interval or
transmitting data at a higher coding rate than during said first time interval, as part of being configured to transmit during a first portion of the second time interval.

18. The first communications device of claim 17, wherein said at least one processor is further configured to determine the duration of the first portion of the second time interval according to a duration determination function.

19. The first communications device of claim 18, wherein said at least one processor is further configured to:
determine a duration of a first portion of a subsequent second time interval according to said function which varies with time, said first portion of the subsequent second time interval having a different duration than the first portion of said second time interval; and
perform a channel measurement during a second portion of the subsequent second time interval in said set of recurring time intervals, said second portion of the subsequent second time interval being a period of time in which said first communications device does not transmit.

20. The first communications device of claim 19, wherein said at least one processor is further configured to:
average channel measurements obtained from different second time intervals which occur over a period of time to produce an average channel estimate for second time intervals.

* * * * *